(12) United States Patent
Kavaler

(10) Patent No.: US 7,382,282 B2
(45) Date of Patent: *Jun. 3, 2008

(54) METHOD AND APPARATUS REPORTING TIME-SYNCHRONIZED VEHICULAR SENSOR WAVEFORMS FROM WIRELESS VEHICULAR SENSOR NODES

(75) Inventor: Robert Kavaler, Kensington, CA (US)

(73) Assignee: Sensys Networks, Inc., Berkeley, CA (US)

( * ) Notice: Subject to any disclaimer, the term of this patent is extended or adjusted under 35 U.S.C. 154(b) by 258 days.

This patent is subject to a terminal disclaimer.

(21) Appl. No.: 11/339,089

(22) Filed: Jan. 24, 2006

(65) Prior Publication Data

US 2006/0132298 A1    Jun. 22, 2006

Related U.S. Application Data

(63) Continuation-in-part of application No. 11/062,130, filed on Feb. 19, 2005.

(60) Provisional application No. 60/695,742, filed on Jun. 29, 2005, provisional application No. 60/549,260, filed on Mar. 1, 2004, provisional application No. 60/630,366, filed on Nov. 22, 2004.

(51) Int. Cl.
  *G08G 1/01*    (2006.01)
  *G07B 15/00*   (2006.01)
(52) U.S. Cl. .................. 340/941; 340/425.5; 340/933; 340/928
(58) Field of Classification Search .............. 340/941, 340/425.5
See application file for complete search history.

(56) References Cited

U.S. PATENT DOCUMENTS

| | | | |
|---|---|---|---|
| 5,491,475 A | 2/1996 | Rouse et al. | |
| 5,748,108 A | 5/1998 | Sampey et al. | |
| 5,877,705 A | 3/1999 | Sampey | |
| 5,880,682 A | 3/1999 | Soiuillard et al. | |
| 6,016,109 A * | 1/2000 | Yosida et al. | 340/941 |
| 6,208,268 B1 | 3/2001 | Scarzello et al. | |
| 6,662,099 B2 | 12/2003 | Knaian et al. | |
| 2002/0145541 A1* | 10/2002 | Matsui et al. | 340/934 |
| 2002/0177942 A1 | 11/2002 | Knaian et al. | |

OTHER PUBLICATIONS

D.E. Culler etal, "Wireless Sensor Networks: Introduction" Comm. of A.C.M., Jun. 2004, pp. 30-33.
R. Szewczyk etal, "Habitat monitoring with Sensor Networks", Comm. of A.C.M., Jun. 2004, pp. 34-40.
J. Hill, "The platforms enabling wireless sensor networks", Comm. of A.C.M., Jun. 2004, pp. 41-46.

(Continued)

*Primary Examiner*—Donnie L Crosland
(74) *Attorney, Agent, or Firm*—Earle Jennings

(57) ABSTRACT

The invention includes using multiple wireless vehicular sensor nodes to wirelessly receive multiple, time-synchronized vehicular waveform reports from the nodes to create a time synchronized system report, and preferably a time synchronized vehicular report. Each vehicular waveform report approximates a raw vehicular sensor waveform observed by a magnetic sensor at the node based upon the presence of a vehicle. The vehicular waveform reports, the time-synchronized system report, and the time synchronized vehicular report are products of this wirelessly receiving process. The invention includes apparatus supporting the above outlined process. Reception of the vehicular waveform reports may be time interleaved.

40 Claims, 27 Drawing Sheets

OTHER PUBLICATIONS

A. Woo etal, "Netowkring support for query processing in sensor networks", Comm. of A.C.M., Jun. 2004, pp. 47-52.

A. Perrig etal, "Security in wireless sensor networks", Comm. of A.C.M., Jun. 2004, pp. 53-57.

Honeywell, "1, 2, and 3 Axis Magnetic Sensors", Honeywell product datasheet, versions available at least 2004, pp. 1-12.

M. Caruso etal, "Vehicle detection & Compass Applications using AMR Magnetic Sensors", Honeywell, since 2004, pp. 1-13.

B. Pant etal, "Magnetic Sensor Cross-Axis Effect", Honeywell App Note AN-205, since 2004, pp. 1-6.

Honeywell, "Vehicle detection using AMR sensors" Honeywell App Note AN-218, since 2004, pp. 1-10.

\* cited by examiner

METHOD AND APPARATUS REPORTING TIME-SYNCHRONIZED VEHICULAR SENSOR WAVEFORMS FROM WIRELESS VEHICULAR SENSOR NODES

CROSS REFERENCES TO RELATED PATENT APPLICATIONS

This application claims priority to Provisional Patent Application 60/695,742, filed on Jun. 29, 2005, and is also a continuation in part of patent application Ser. No. 11/062,130, filed Feb. 19, 2005, which claims priority to Provisional Patent Application Ser. No. 60/549,260, filed Mar. 1, 2004 and Provisional Patent Application Ser. No. 60/630,366, filed Nov. 22, 2004, all of which are incorporated herein by reference.

TECHNICAL FIELD

This invention relates to wireless vehicular sensor networks, in particular, to the reporting of the waveforms approximating the raw sensor readings due to the presence of motor vehicles.

BACKGROUND OF THE INVENTION

Today, there are numerous situations in which confirming the type of vehicle passing over a spot on the road is important. While visual inspections can provide a good deal of information, they do not readily report the magnetic signature of a vehicle, which can reveal additional details about the vehicle contents. Methods are needed for determining that magnetic signature in a cost effective and reliable manner.

The situation has some significant hurdles. Running wires to sensors embedded in roadways turns out to be difficult, expensive, and often unreliable in the rugged environment of a roadway with multiple ton vehicles rolling over everything on a frequent basis. What is needed is a way to use a wireless vehicular sensor node to report something approximating the raw vehicular sensor waveform via wireless communications.

Wireless vehicular sensor networks often use repeaters and/or some of the vehicular sensor nodes to wirelessly convey wireless messages from distant sensor nodes to where they are collected, which will be referred to herein as intermediate nodes. These intermediate nodes are usually essentially invisible to the network, but add a significant delay to the time from the sending of the messages, and their reception at the collection node. Additionally, a wireless vehicular sensor network may not provide a ready mechanism to time synchronizing these messages, making it difficult form an accurate picture of the magnetic signatures of the sensor state of these systems taken as a whole. What is needed are methods and mechanisms supporting the time synchronization of these reports which allows a view of the system state at a given moment to be assembled.

SUMMARY OF THE INVENTION

The invention includes using multiple wireless vehicular sensor nodes to wirelessly receive multiple time-synchronized vehicular waveform reports from the wireless vehicular sensor nodes to create a time synchronized system report. By way of example, the invention uses a first wireless vehicular sensor node and a second wireless vehicular sensor node to wirelessly receive a first vehicular waveform report from the first wireless vehicular sensor node time-synchronized with a second vehicular waveform report from the second wireless vehicular sensor node as shown in FIG. 1.

Time synchronization supports a more rigorous analysis of the vehicular waveform reports, due to essentially the aligning the times of successive samples of the reports. Consider the example of the vehicle of FIG. 2A traversing near wireless vehicular sensor nodes, in particular the first wireless vehicular sensor node, followed by the second wireless vehicular sensor node, a third wireless vehicular sensor node, and a fourth wireless vehicular sensor node. FIG. 2B shows an example of what can happen without time synchronization, and 2C shows the effect of time synchronization as the time synchronized vehicular report, which is produced from the time synchronized system report. Without time synchronization, the views of the vehicle reported by the wireless vehicular sensor nodes are confused. With time synchronization, the vehicle can be seen clearly, in fact more clearly than any one sensor can show.

The use of time synchronization can be further seen in FIGS. 3A to 3C. FIG. 3A shows the first vehicular waveform report, the second vehicular waveform report, the third vehicular waveform report, and the fourth vehicular waveform report as they appear across time, in the time synchronized system report. FIG. 3B shows just the first vehicular waveform report and 3C shows the effect using the time synchronized system report to create the time synchronized vehicular report.

The method of time synchronization will be discussed in terms of the operations of the means for wirelessly receiving using an example implementation shown in FIG. 19 and further detailed in FIGS. 25A and 25B. Examples of alternative embodiments are shown in FIGS. 17B to 17D.

There are at least two basic approaches to creating time synchronization at the system level. The first approach time synchronizes the first raw vehicular sensor waveform observed at the first wireless vehicular sensor node with the second raw vehicular sensor waveform observed at the second wireless vehicular sensor node. In the second approach, the time synchronization is performed by the means for receiving using the transmit times of the reports and from the wireless vehicular sensor nodes, along with their reception time at the means for receiving, as shown in FIG. 19.

The first approach may further include all the relevant wireless vehicular sensor nodes wirelessly receiving a time synchronization message. The first wireless vehicular sensor node and the second wireless vehicular sensor node both receive the time synchronization message as shown in FIGS. 4 and 5A. The first raw vehicular sensor waveform observed at the first wireless vehicular sensor node may preferably be raw time synchronized with the second raw vehicular sensor waveform observed at the second wireless vehicular sensor node. This leads to the first vehicular waveform report being report time synchronized to the second vehicular waveform report.

The invention includes a program system implementing the method residing in a memory accessible coupling to at least one computer, comprising the program steps creating the time synchronized system report and/or creating the time synchronized vehicular report. The memory may include at least one instance of one or more of the following: a magnetic disk, an optical disk, a non-volatile memory component, a volatile memory component, and a bar coded medium.

BRIEF DESCRIPTION OF THE DRAWINGS

FIGS. 21A to 22A show some details of operating the wireless vehicular sensor node to transmit the long report when the vehicle is moving near the node;

DETAILED DESCRIPTION

Figure 1:
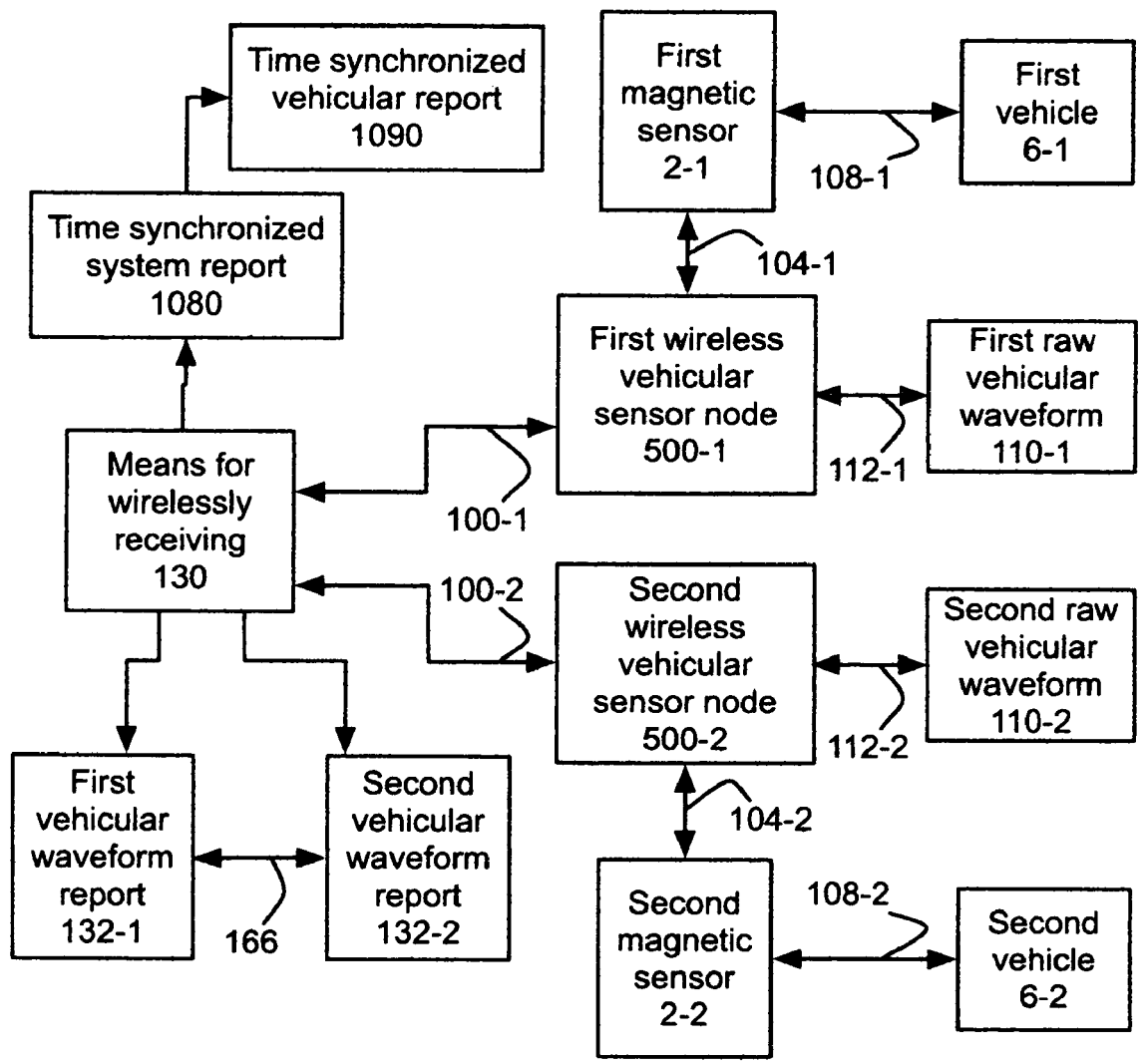
FIG. 1 shows an example of the invention receiving time synchronized vehicular waveform reports from wireless vehicular sensor nodes operating magnetic sensors.

This invention relates to wireless vehicular sensor networks, in particular, to the reporting of the waveforms approximating the raw sensor readings due to the presence of motor vehicles. The invention includes using multiple wireless vehicular sensor nodes to wirelessly receive multiple time-synchronized vehicular waveform reports from the wireless vehicular sensor nodes. By way of example, the invention uses a first wireless vehicular sensor node 500-1 and a second wireless vehicular sensor node 500-2 to wirelessly receive 130 a first vehicular waveform report 132-1 from the first wireless vehicular sensor node time-synchronized 166 with a second vehicular waveform report 132-2 from the second wireless vehicular sensor node to create the time synchronized system report 1080 as shown in FIG. 1.

Figure 2A:
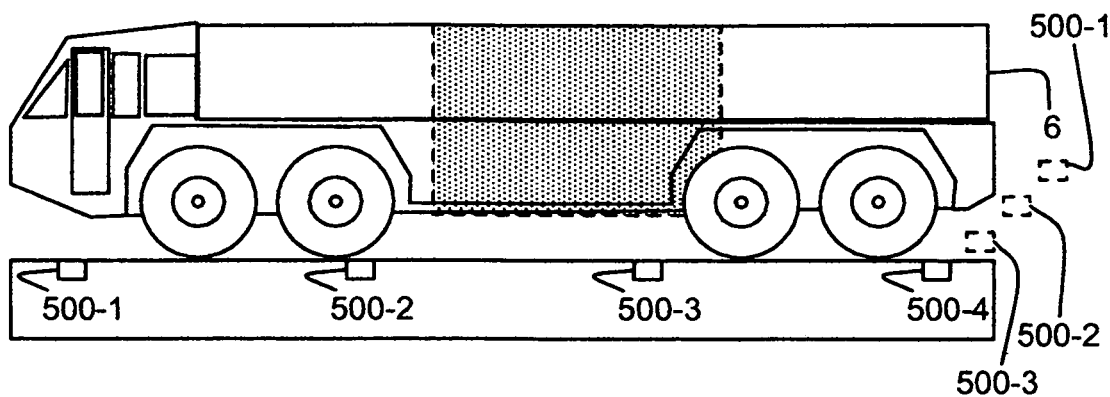
FIGS. 2A to 3C shows examples of the effect of time synchronization of the vehicular waveform reports of FIG. 1A.
Figure 2B:
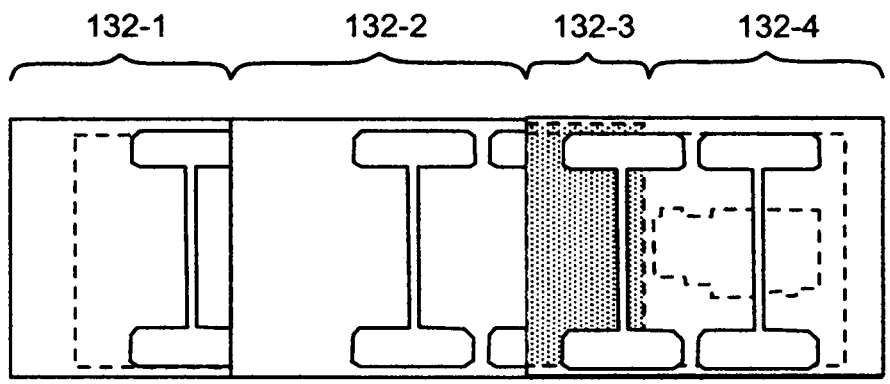
Figure 2C:
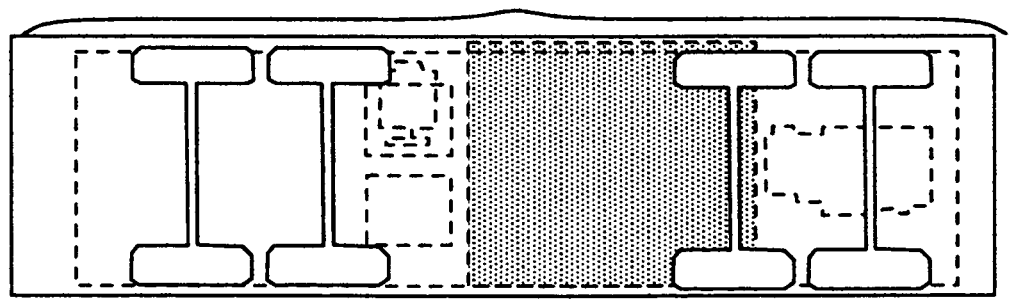

Time synchronization supports a more rigorous analysis of the vehicular waveform reports, due to essentially the aligning the times of successive samples of the reports. Consider. the example of the vehicle 6 of FIG. 2A traversing near wireless vehicular sensor nodes, in particular the first wireless vehicular sensor node 500-1, followed by the second wireless vehicular sensor node 500-2, a third wireless vehicular sensor node 500-3, and a fourth wireless vehicular sensor node 500-4. The following discussion will assume that the wireless vehicular sensor nodes are arranged parallel the flow of traffic, as shown by the instances with solid line boxes in the Figure. However, the following discussion is equally applicable to sensors arranged in other configurations, such as perpendicular to the flow of traffic, as indicated by the dashed line boxes. The perpendicular configuration is often preferred, but more difficult to visualize. FIG. 2B shows an example of what can happen without time synchronization, and FIG. 2C shows the benefit of time synchronization as the time synchronized vehicular report 1090, which is produced from the time synchronized system report 1080. Without time synchronization, the views of the vehicle reported by the wireless vehicular sensor nodes may be confused, in part because of delays in the time between sending and receiving the reports, as well as differences in the sensor node's perception of time. With time synchronization, the vehicle can be seen clearly, in fact more clearly than any one sensor can show.

Figure 3A:
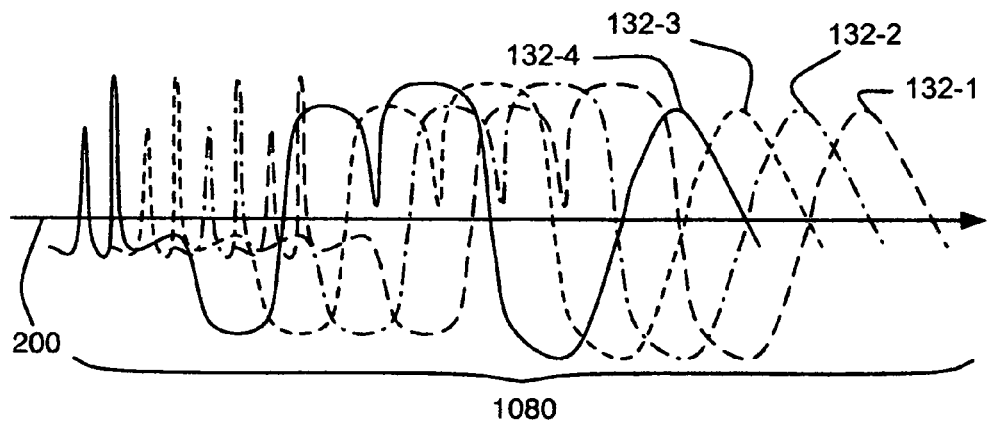
Figure 3B:
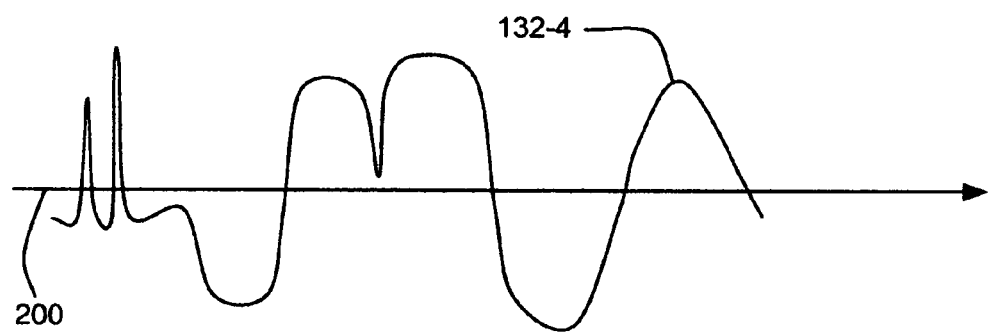
Figure 3C:
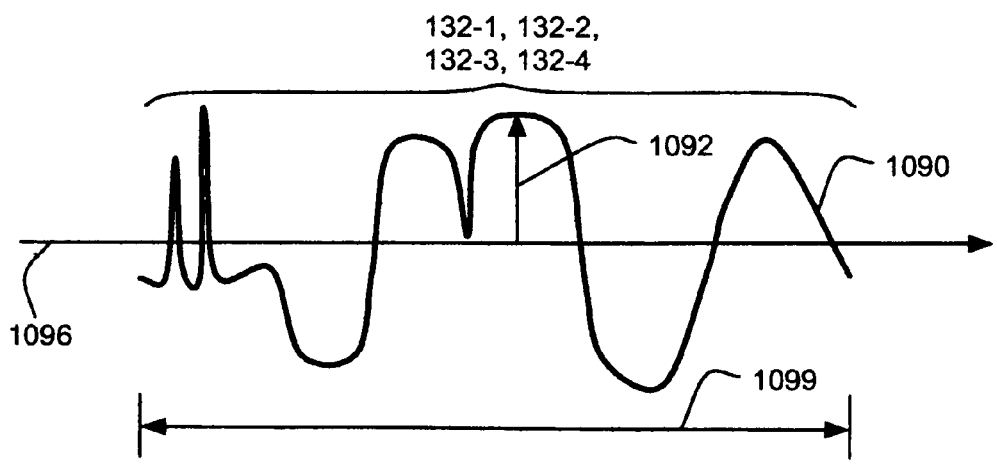

Because of these delays in receiving the reports, there may be no coherent system picture that can be developed. Reports for the same vehicle may be so scattered about in time that some reports are deleted before others even arrive at the means for wirelessly receiving 130. The use of time synchronization can be further seen in FIGS. 3A to 3C. FIG. 3A shows the first vehicular waveform report 132-1, the second vehicular waveform report 132-2, the third vehicular waveform report 132-3, and the fourth vehicular waveform report 132-4 as they appear across time 200, in the time synchronized system report 1080. FIG. 3B shows just the first vehicular waveform report 132-1 and FIG. 3C shows the effect of further time synchronizing of these reports to create the time synchronized vehicular report 1090 for the vehicle 6. The time synchronized vehicular report includes a vehicle event entry 1092 at a wave time 1096 for each sample time step over a report duration 1099. The process of creating the time synchronized system report and the time synchronized vehicular report will be further discussed after a discussion of the overall system in which the invention operates.

Figure 17A:
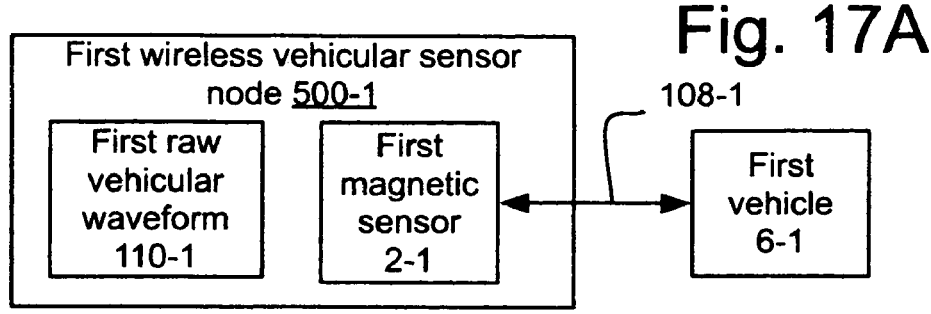
FIG. 17A shows the first wireless vehicular sensor node including the first magnetic sensor and the first raw vehicular waveform.
Figure 17B:
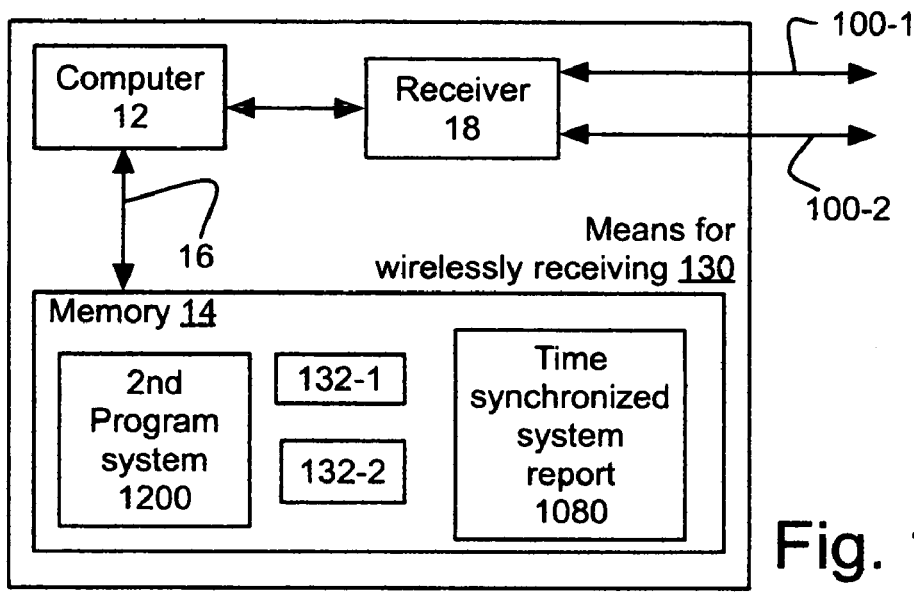
FIGS. 17B to 17D show examples of the means for receiving.
Figure 17C:
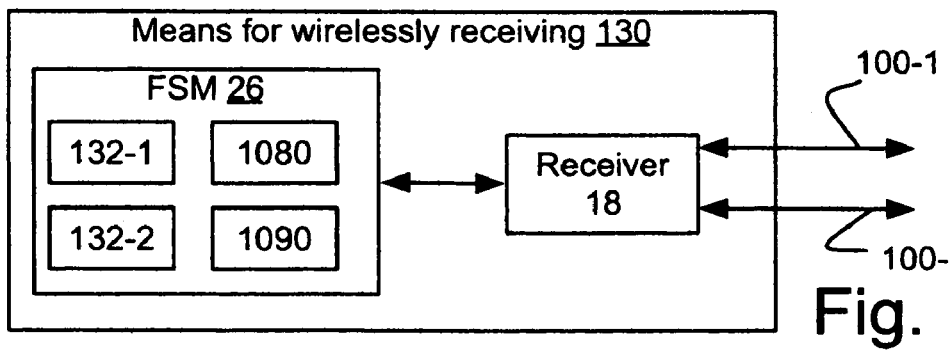
Figure 17D:
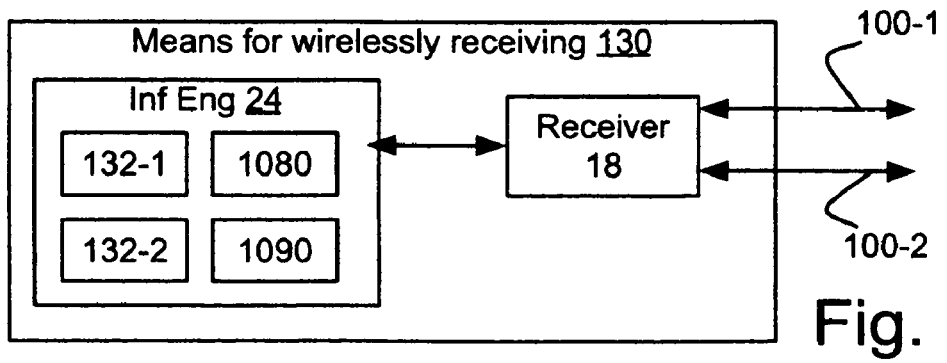

The method of time synchronization will be discussed in terms of the operations of the means for wirelessly receiving 130 using an example implementation shown in FIG. 19 and further detailed in FIGS. 25A to 26C. Examples of alternative embodiments are shown in FIGS. 17B to 17D.

There are at least two basic approaches to creating time synchronization at the system level. The first approach time synchronizes the first raw vehicular sensor waveform 110-1 observed at the first wireless vehicular sensor node 500-1 with the second raw vehicular sensor waveform 110-2 observed at the second wireless vehicular sensor node 500-2. In the second approach, the time synchronization is performed by the means for receiving 130 using the transmit times of the reports 132-1 and 132-2 from the wireless vehicular sensor nodes, along with their reception time 1060 at the means for receiving, as shown in FIG. 19.

Figure 4:
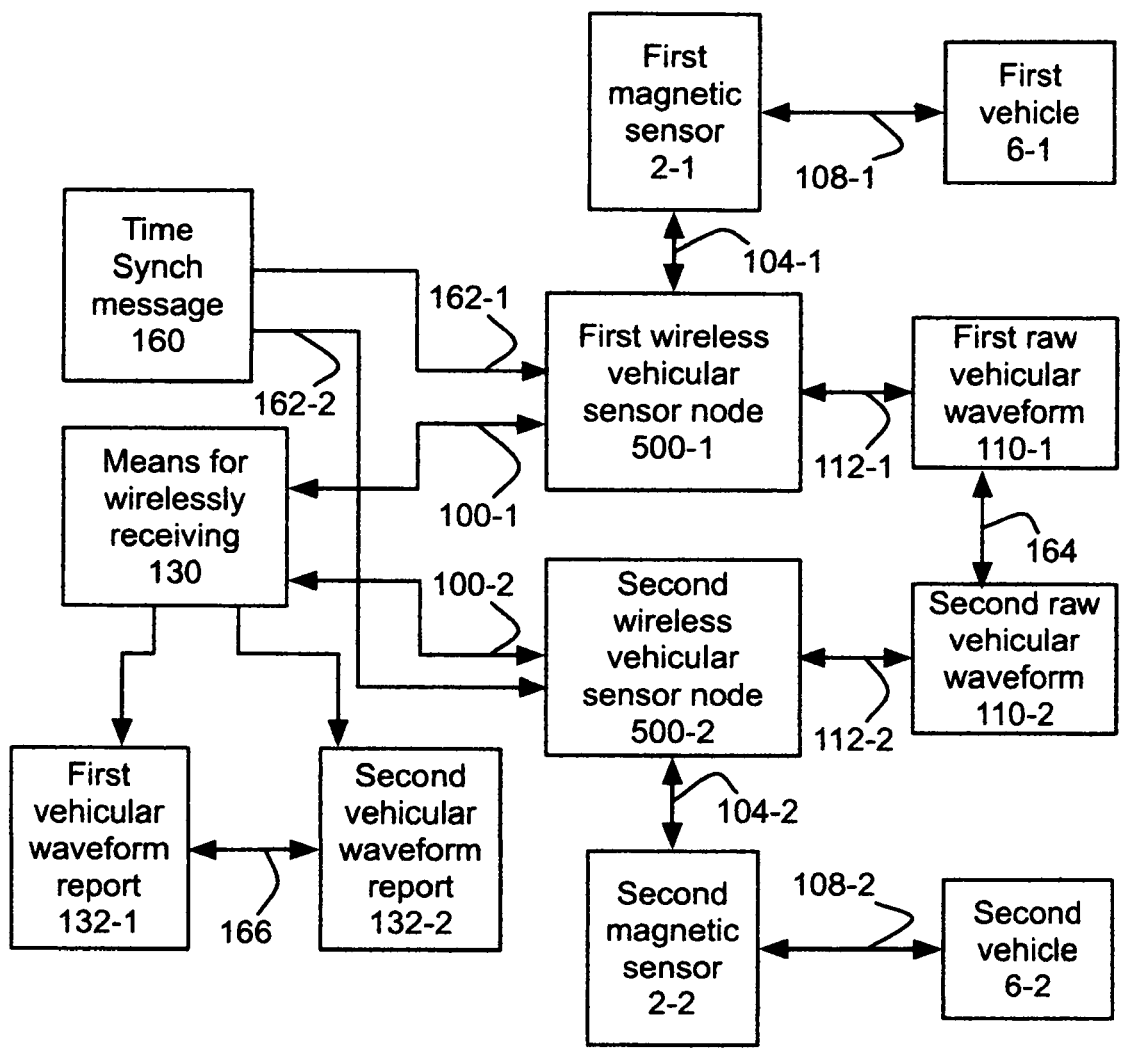
FIGS. 4 and 5A show some examples of the a first approach to time-synchronization through the wireless vehicular sensor nodes receiving a time synchronization message.
Figure 5A:
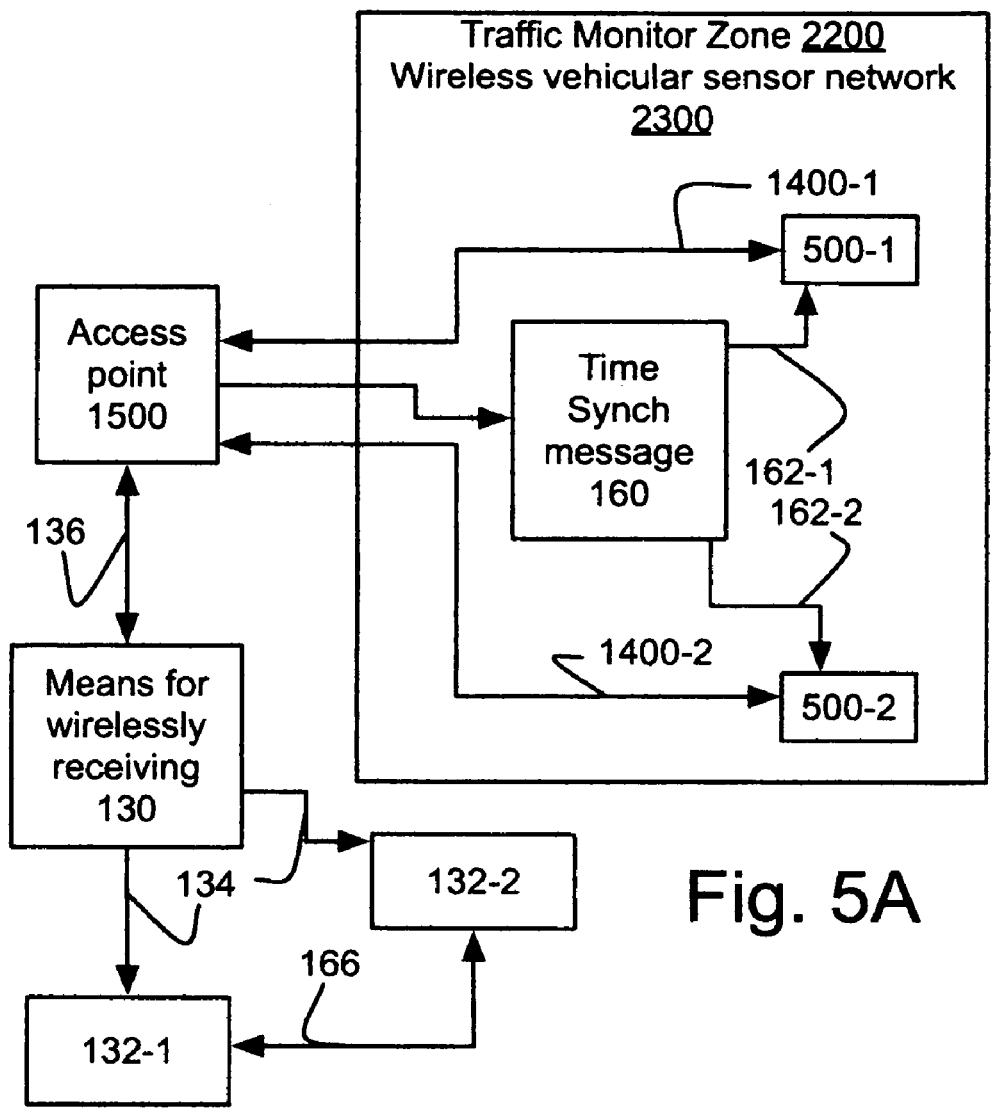

The first approach may further include all the relevant wireless vehicular sensor nodes wirelessly receiving a time synchronization message. The first wireless vehicular sensor node 500-1 and the second wireless vehicular sensor node 500-2 both receive the time synchronization message 160 as shown in FIGS. 4 and 5A. The first raw vehicular sensor waveform 110-1 observed at the first wireless vehicular sensor node may preferably be raw time synchronized 164 with the second raw vehicular sensor waveform 110-2 observed at the second wireless vehicular sensor node. This leads to the first vehicular waveform report 132-1 being report time synchronized 166 to the second vehicular waveform report 132-2.

Figure 5B:
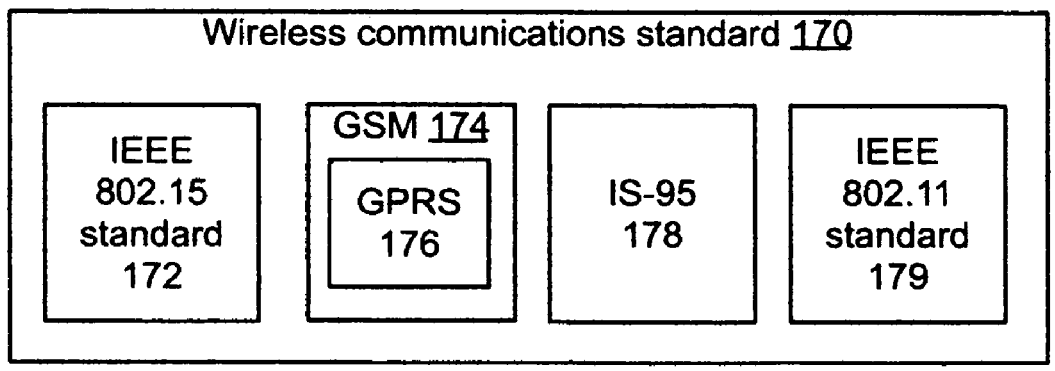
FIG. 5B show some wireless communication standards which may be employed to wirelessly communicate with the wireless vehicular sensor nodes.

The access point may preferably send the time synchronization message. By way of example, the access point 1500 may preferably send 168 the time synchronization message to both the first wireless vehicular sensor node 500-1 and the second wireless vehicular sensor node 500-2, as shown in FIG. 5A. The wireless vehicular sensor network 2300 may support at least one wireless communications standard 170, as shown in FIG. 5B. The network may support the IEEE 802.15 communications standard 172, or a version of the Global System for Mobile or GSM communications standard 174. The version may be compatible with a version of the General Packet Radio Service (GPRS) communications standard 176.

The wireless vehicular sensor network 2300 may support a version of the IS-95 communications standard 178, or a version of the IEEE 802.11 communications standard 179. The network may support other spread spectrum and/or orthogonal frequency division multiplexing schemes, including but not limited to, Code Division Multiple Access 177, frequency hopping and time hopping scheme.

Figure 9A:
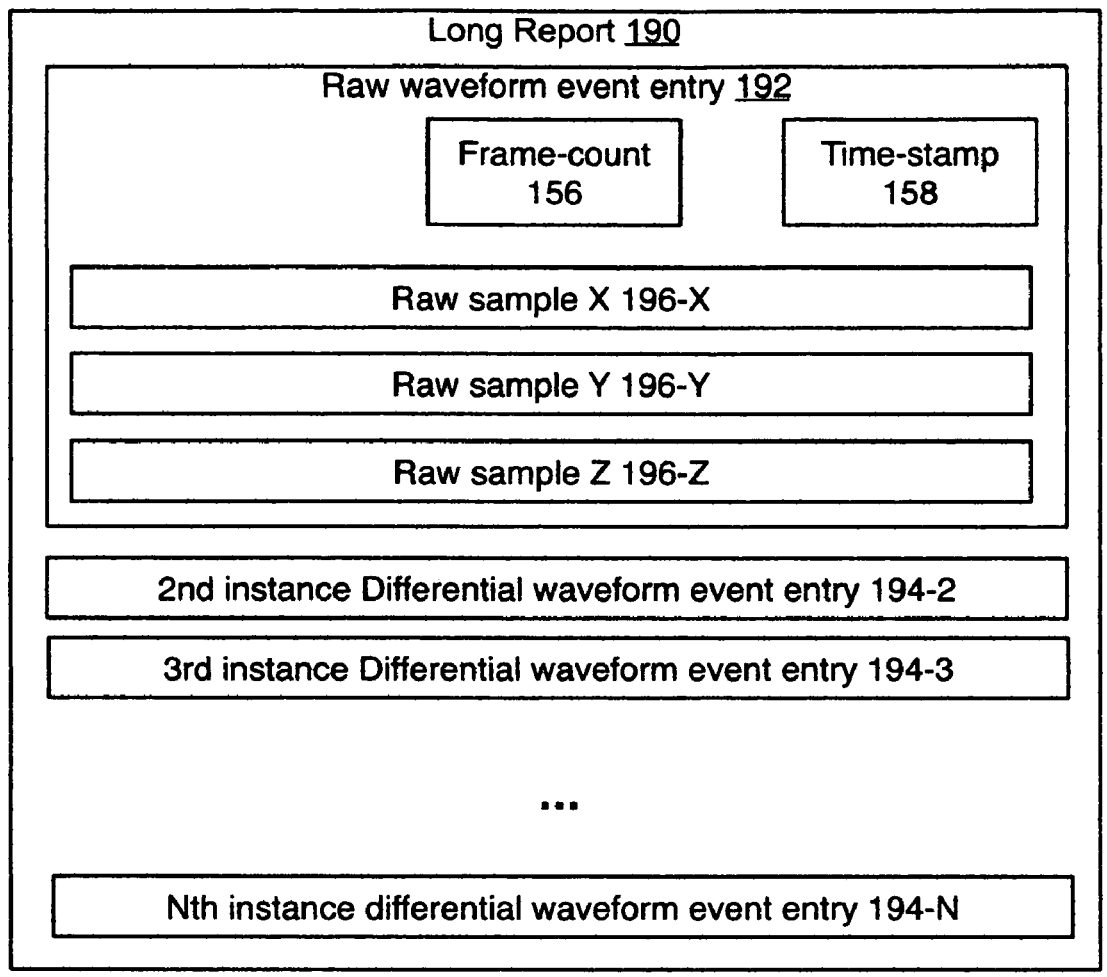
FIGS. 9A and 9B show some details of an example of the long report.
Figure 18:
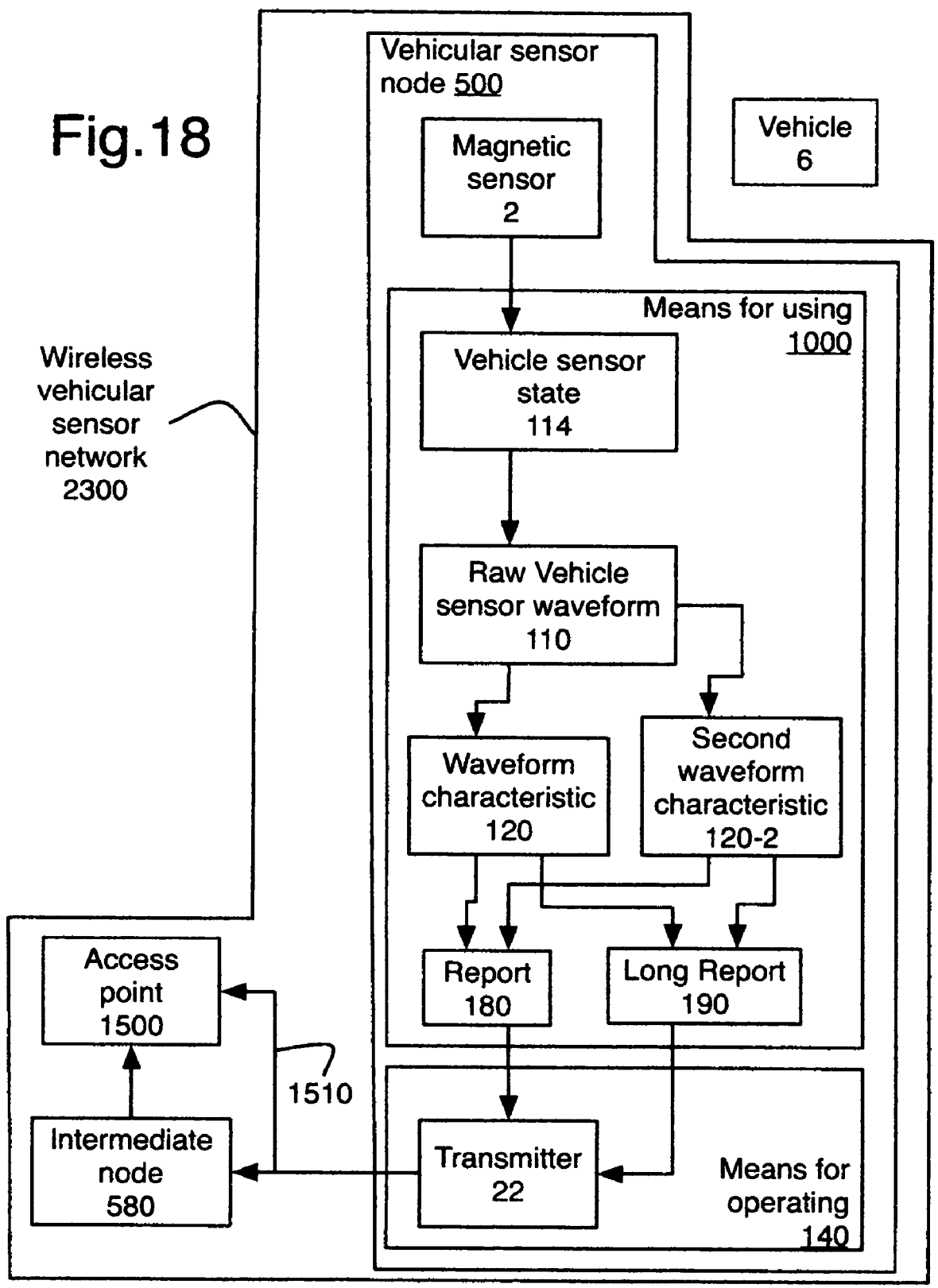
FIGS. 18 and 20 show some examples of a wireless vehicular sensor node used in the invention.

The wireless vehicular sensor nodes preferably send a long report, including a first event time and event samples for successive time steps. The long report 190 is preferably generated within the wireless vehicular sensor node 500, as shown in FIGS. 18 and 20, then transmitted to the means for using 130 and/or the access point 1500, as shown in FIG. 19. The long report includes a first event time 191 and event samples for successive time steps, as shown in FIG. 9A. The long report may further preferably be at least part, and often all, of the data payload of a packet in a wireless vehicular sensor network 2300 of FIG. 13B to 16, and 5A, as the wireless communications standard 170 of FIG. 5B.

The long report 190 may further preferably include a raw waveform event entry 192 including the first event time, a raw sample X 196-X, a raw sample Y 196-Y, and a raw sample Z 196-Z. the first event time may include a framecount 156 and a time-stamp 158, which will be further discussed regarding the use of the vehicular sensor node for traffic monitoring.

Figure 9B:
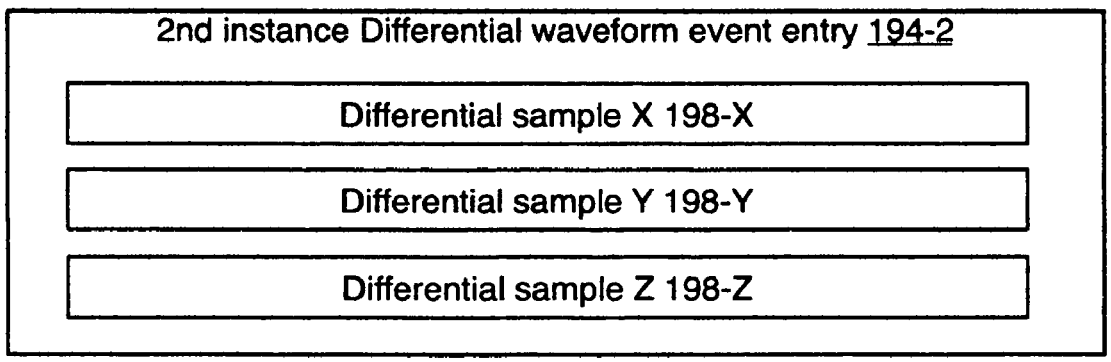

The event samples of successive time steps may be reported with an instance of a differential waveform event entry 194, each of which includes a differential sample of X 198-X, a differential sample of Y 198-Y, and a differential sample of Z 198-Z, as shown in FIG. 9B.

The long report 190 preferably includes the raw waveform event entry 192 and N-1 instances of the differential waveform event entry 194. N may be preferred to be a power of two, and may further be preferred to be sixteen. The time step is preferably chosen to support at least 128 samples per second, further preferably supporting 256 samples per second. Each of the raw samples, X, Y, and Z, may preferably be represented by an integer or fixed point number of at least 8 bits, preferably, 12 bits, and further preferably 16 bits. The long report may further be compressed at the wireless vehicular sensor node using code compression techniques such as Huffman coding. The instances of the differential waveform event entry shown in FIG. 9A are as follows: the second instance of the differential waveform event entry 194-2, the third instance of the differential waveform event entry 194-3, and the N-th instance of the differential waveform event entry 194-N.

In the second approach to time synchronization, each long report 190 may include the transmit time 199 observed at the node when the long report was sent. FIG. 8C shows an extension to the raw waveform event entry 192 of FIG. 9A, which further includes a transmit time 199. This approach supports the first vehicular waveform report 132-1 report time synchronized 166 with the second vehicular waveform report 132-2, without any assurance of time synchronization of the first wireless vehicular sensor node 500-1 with the second wireless vehicular sensor node 500-2.

Each vehicular waveform report approximates a raw vehicular sensor waveform observed by a magnetic sensor at the vehicular sensor node based upon the presence of a vehicle. The first vehicular waveform report 132-1 approximates the first raw vehicular sensor waveform 110-1 observed by a first magnetic sensor 2-1 at the first wireless vehicular sensor node 500-1 based upon the presence of a first vehicle 6-1. The second vehicular waveform report 132-2 approximates the second raw vehicular sensor waveform 110-2 observed by a second magnetic sensor 2-2 at the second wireless vehicular sensor node 500-2 based upon the presence of a second vehicle 6-2.

Figure 19:
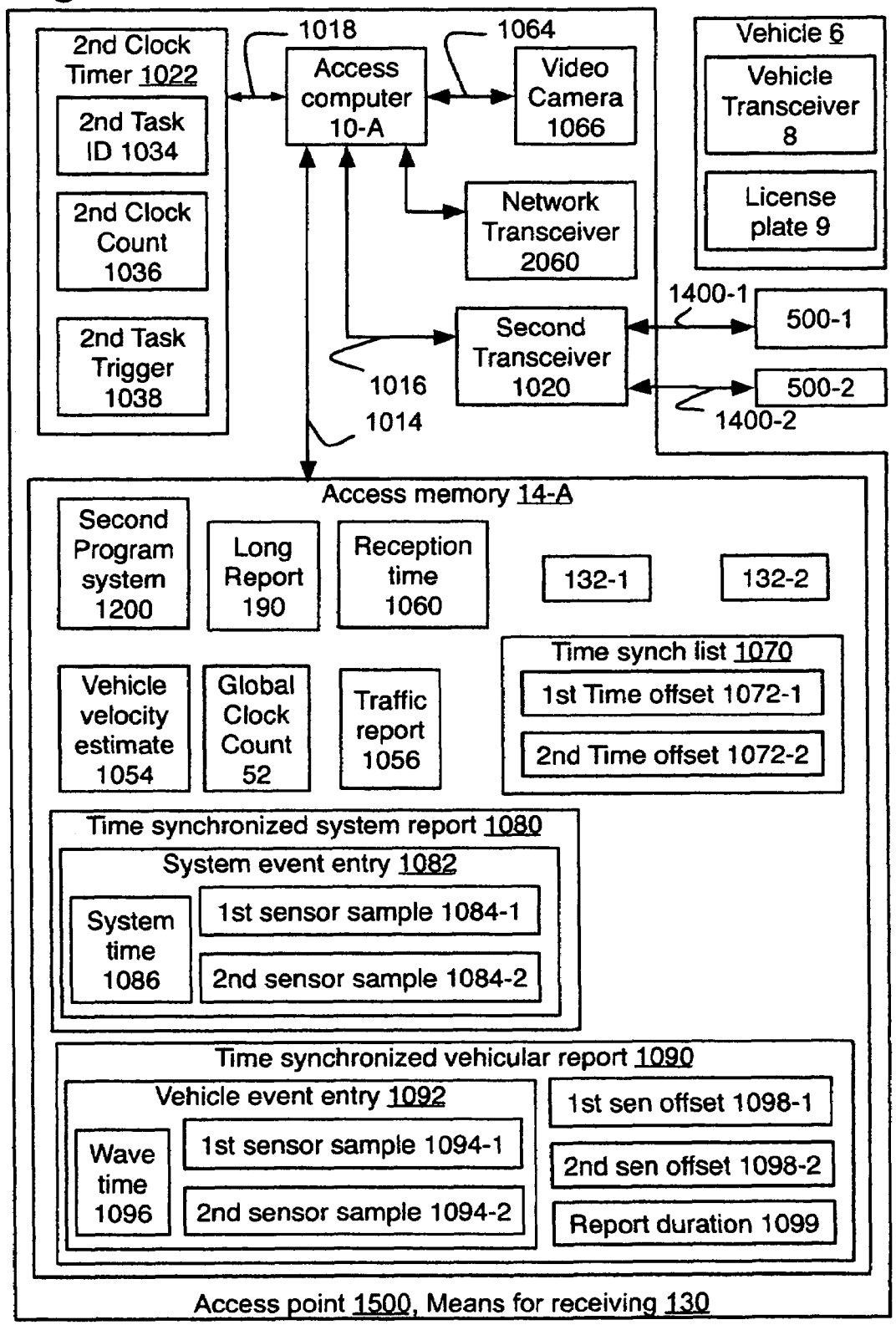
FIG. 19 shows some details of an example access point and/or means for receiving of the previous Figures.
Figure 20:
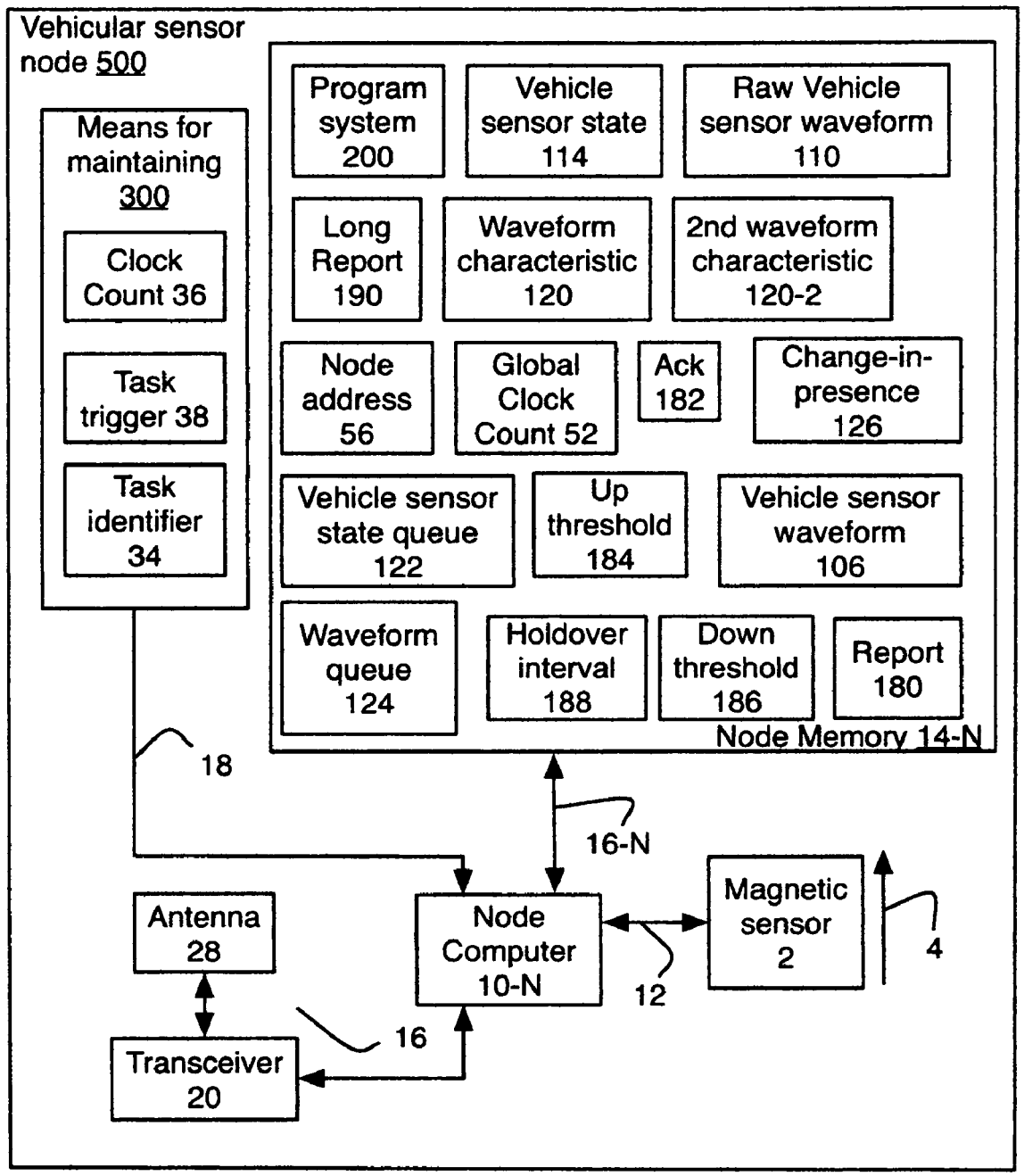

Continuing the discussion of the second approach to time synchronization, consider again FIG. 19 for an example of the operation of this approach. Upon receiving the long report 190 from the first wireless vehicular sensor node 500-1, the access computer 10-A is directed by the program system 600 to capture the reception time 1060 in the access memory 14-A. The long report preferably includes the raw waveform event entry 192 as in FIG. 8C, which includes the transmit time 199. The transmit time will preferably refer to an estimate of the overall system time as measured at the wireless vehicular sensor node sending the long report.

The time synchronization list 1070 preferably includes the difference between the reception time and the transmit time as the time offset for the wireless vehicular sensor node. By way of example, the time synchronization list includes the first time offset 1072-1 for the first wireless vehicular sensor node 500-1 and the second time offset 1072-2 for the second wireless vehicular sensor node 500-2, both of which are calculated in this fashion.

Whether or not the long report 190 from the first wireless vehicular sensor node 500-1 is time-interleaved 134 with the long report from the second wireless vehicular sensor node 500-2, the long report is used to build the time synchronized system report 1080 by providing a reported sample from either the raw waveform event entry 192 or an instance of the differential waveform event entry 194 as shown in FIGS. 9A and 9B.

The time synchronized system report 1080 preferably includes multiple instances of the system event entry 1082, which includes the first sensor sample 1084-1 from a long report 190 received from the first wireless vehicular sensor node 500-1 and the second sensor sample 1084-2 from another long report received from the second wireless vehicular sensor node 500-2. The first sensor sample and the second sensor sample are report time synchronized 166 to a system time 1086, which may be either explicitly or implicitly part of the system event entry. The system time is derived by examining the long report 190 for the transmit time 199 and the time-stamp 158, and calculating the system time also based upon the first time offset 1072-1 from the time synchronization list 1070. Typically, the raw waveform event entry 192 is at the time-stamp, whereas each subsequent differential waveform event entry 194 is at a time-increment from its predecessor.

The sensor sample consequently includes either the raw sample X 196-X, the raw sample Y 196-Y, and the raw sample Z 196-Z;

Or alternatively, the differential sample of X 198-X added to raw sample X, the differential sample of Y 198-Y added to raw sample Y, and the differential sample of Z 198-Z added to raw sample Z.

As used herein, each of the invention's wireless vehicular sensor node operates a magnetic sensor. The first wireless vehicular sensor node first operates 104-1 the first magnetic sensor. And the second wireless vehicular sensor node second operates 104-2 the second magnetic sensor. At least one, and often preferably, all the wireless vehicular sensor nodes may include their magnetic sensors. By way of example, FIG. 17A shows the first wireless vehicular sensor node 500-1 include the first magnetic sensor 2-1. The second wireless vehicular sensor node 500-2 may include the second magnetic sensor 2-2, as shown in FIG. 17B. Each wireless vehicular sensor node 500 may further include the magnetic sensor 2 as shown in FIGS. 18 and 20.

The first vehicular waveform report 132-1 and the second vehicular waveform report 132-2 are products of the process of wirelessly receiving first vehicular waveform report time-interleaved with the second vehicular waveform report.

The invention includes apparatus supporting the above outlined process, including means for wirelessly receiving 130 the first vehicular waveform report 132-1 from the first wireless vehicular sensor node 500-1 time-interleaved with the second vehicular waveform report 132-2 from the second wireless vehicular sensor node 500-2.

The means for wirelessly receiving 130 may first wirelessly communicate 100-1 with the first wireless vehicular sensor node 500-1. The means for wirelessly receiving may also second wirelessly communicate 100-2 with the second wireless vehicular sensor node 500-2. Note that these wireless communications may or may not use the same physical transports and/or communications protocols. These wireless communications may be encrypted, and the communications with one wireless vehicular sensor node may or may not be decipherable by the other wireless vehicular sensor node.

Figure 6A:
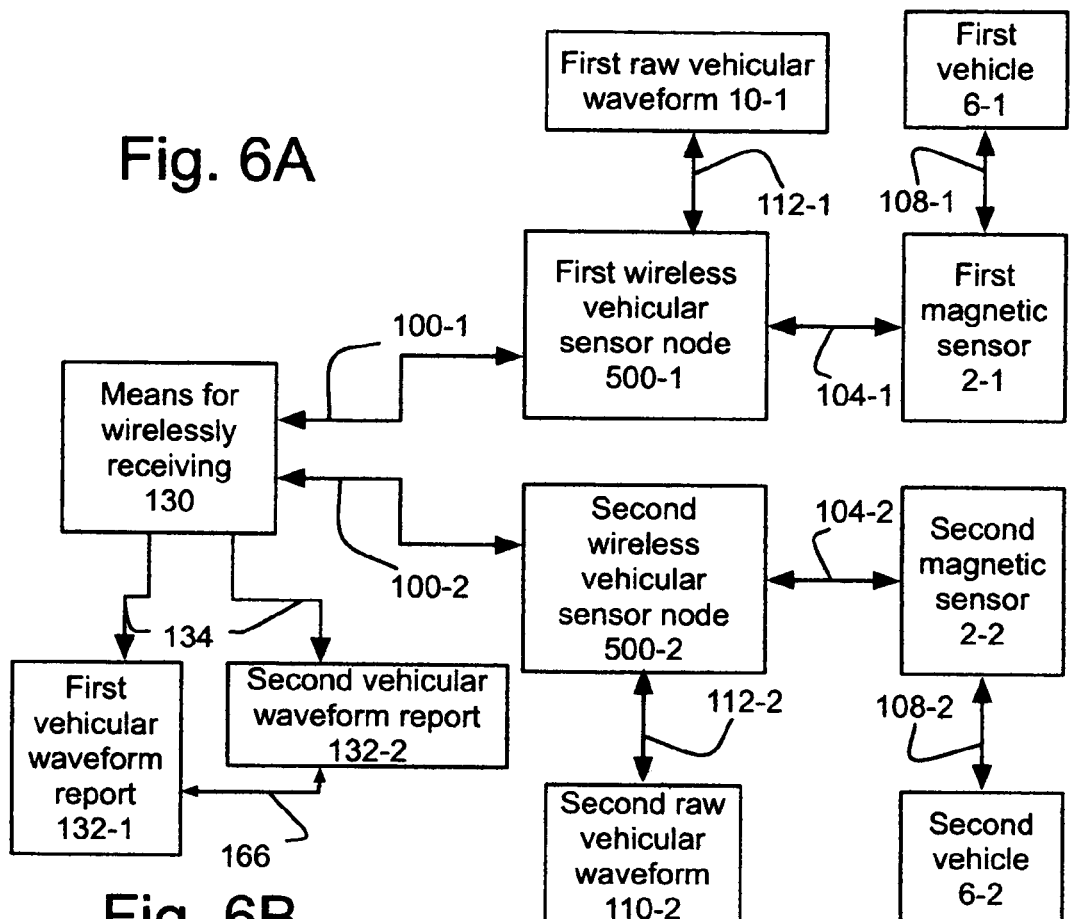
FIG. 6A shows an example of wirelessly receiving time-interleaved vehicular waveform reports from wireless vehicular sensor nodes operating magnetic sensors.

The time-interleaved reception 134 is shown through a series of snapshots of the means for wirelessly receiving 130 of FIG. 6A including the first vehicular waveform report 132-1 and the second vehicular waveform report 132-2, as shown in FIGS. 6B to 7D. The means for wirelessly receiving may in certain embodiments, not include the first vehicular waveform report and the second vehicular waveform report, which is shown in FIG. 6A.

Figure 6B:
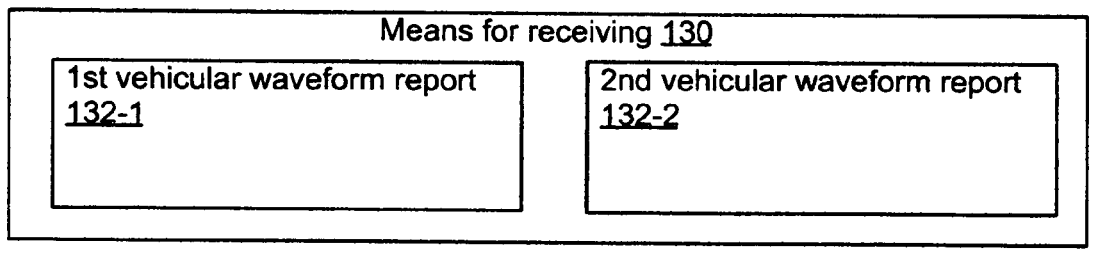
FIGS. 6B to 7D show examples of time-interleaved reception of the vehicular waveform reports of FIG. 6A.

FIG. 6B shows an example of an initial state for the first vehicular waveform report and the second vehicular waveform report.

Figure 6C:
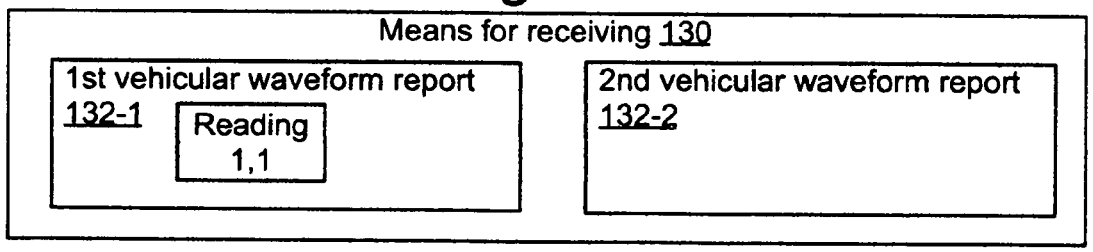

FIG. 6C may show the next time step from FIG. 6C with the means for wirelessly receiving including the first vehicular waveform report has wirelessly received a first reading of the first vehicle Reading 1,1. And the second vehicular waveform report is still in its initial condition.

Figure 7A:
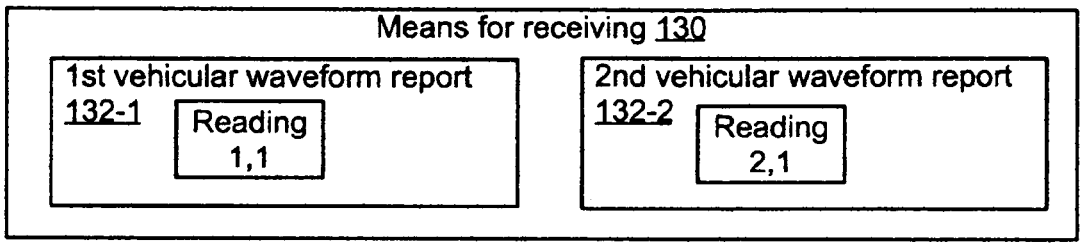

FIG. 7A may show the next time step from FIG. 6C with the means for wirelessly receiving including the first vehicular waveform report has wirelessly received a first reading of the first vehicle Reading 1,1. And the second vehicular waveform report has wirelessly received a first reading of the second vehicle Reading 2,1.

Figure 7B:
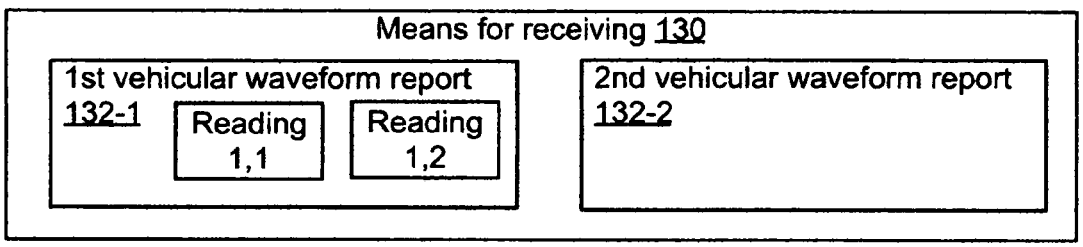

Alternatively FIG. 7B may show the next time step from FIG. 6C with the means for wirelessly receiving including the first vehicular waveform report having wirelessly received a first reading of the first vehicle Reading 1,1 and a second reading of the first vehicle Reading 1,2. And the second vehicular waveform report is still in its initial condition.

Figure 7C:
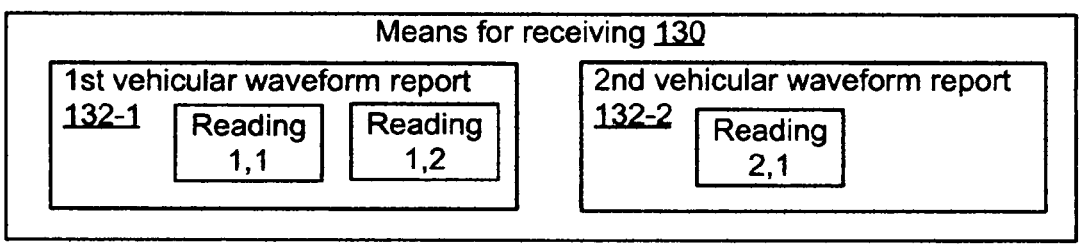

FIG. 7C may show the next time step from either FIG. 7A or FIG. 7B, with the means for wirelessly receiving including the first vehicular waveform report having wirelessly received a first reading of the first vehicle Reading 1,1 and a second reading of the first vehicle Reading 1,2. The second vehicular waveform report has wirelessly received a first reading of the second vehicle Reading 2,1.

Figure 7D:
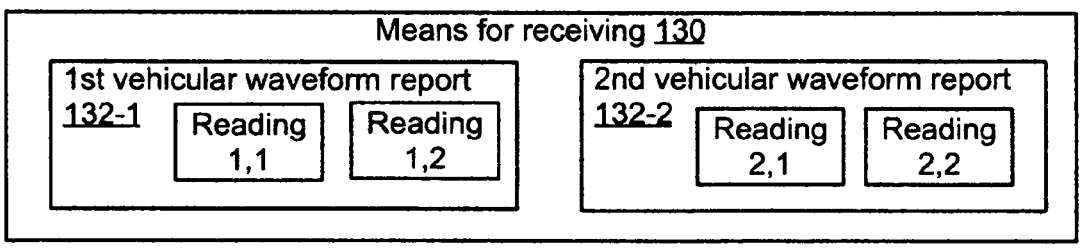

FIG. 7D may show the next time step from either FIG. 7A or FIG. 7C with the means for wirelessly receiving including the first vehicular waveform report having wirelessly received a first reading of the first vehicle Reading 1,1 and a second reading of the first vehicle Reading 1,2. The second vehicular waveform report has wirelessly received a first reading of the second vehicle Reading 2,1 and a second reading of the second vehicle Reading 2,2.

Figure 13A:
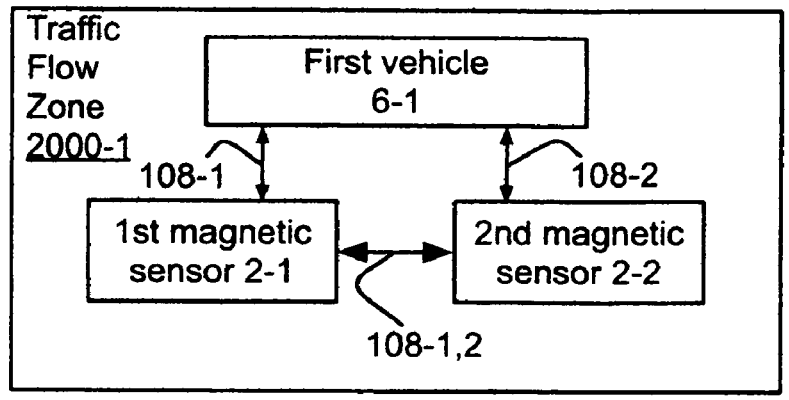
FIGS. 13A to 16 shows various example configurations of the invention.

An example of an embodiment in which the first vehicle 6-1 may be the same as the second vehicle 6-2 is shown in FIG. 13A. The traffic flow zone 2000-1 includes both the first magnetic sensor 2-1 and the second magnetic sensor 2-2, spaced at a distance between first and second sensors 108-1,2 sufficiently small, that the first vehicle 6-1 is observed by both magnetic sensors. By way of example, the distance between first and second sensors may preferably be less than three meters, further preferably less than two meters, possibly as little as one meter. The first distance 108-1 between the first magnetic sensor and the first vehicle, as well as the second distance 108-2 between the second magnetic sensor and the first vehicle, are both preferably less than three meters, and further preferred to be less than two meters, and may further preferably be less than 1 meter.

Figure 13B:
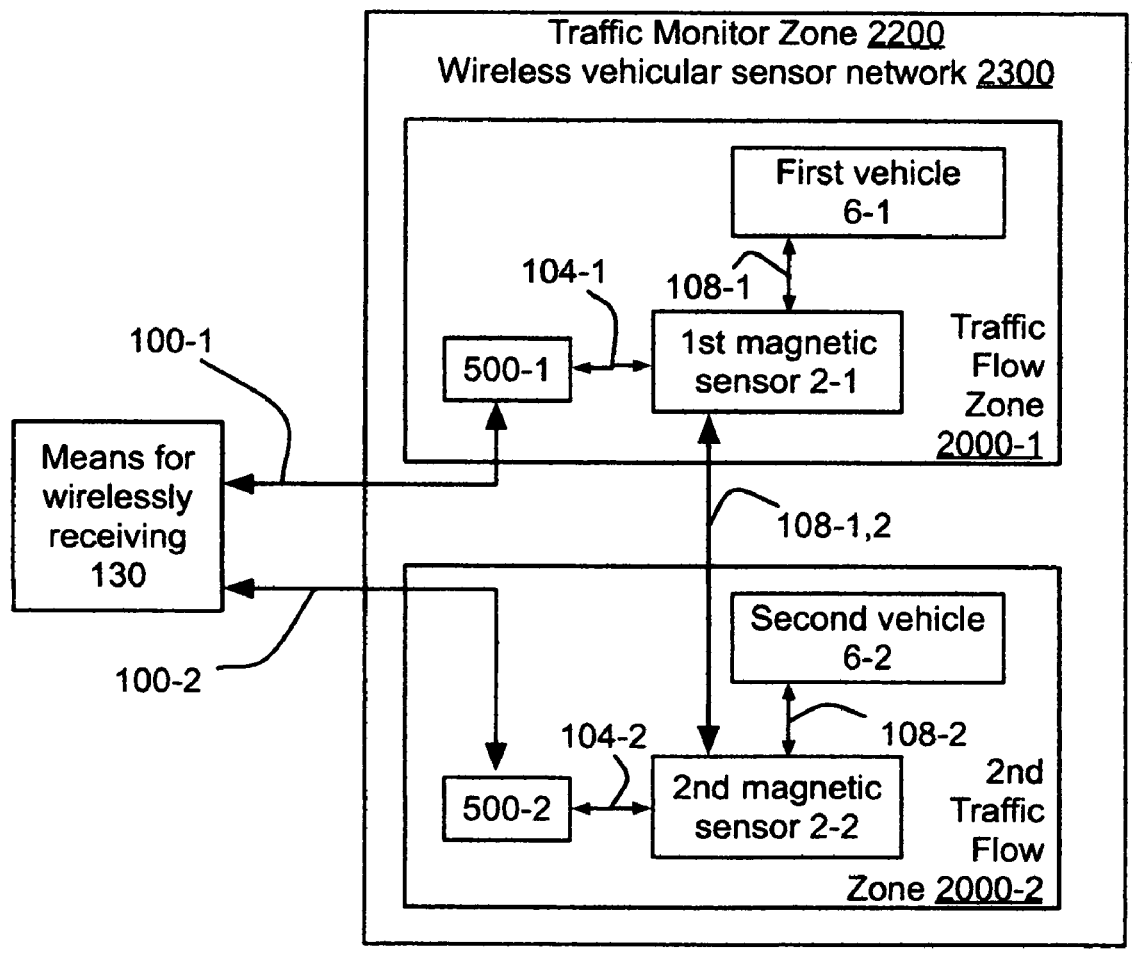

Alternatively, the first vehicle 6-1 may be distinct from the second vehicle 6-2 as shown by the example of FIG. 13B. The first traffic flow zone 2000-1 includes the first magnetic sensor 2-1. The second traffic flow zone 2000-2 includes the second magnetic sensor 2-2. The first magnetic sensor 2-1 and the second magnetic sensor 2-2 are spaced at a distance between first and second sensors 108-1,2 sufficiently large, so that the first vehicle is observed by only the first magnetic sensor, and the second vehicle is observed only by the second magnetic sensor. By way of example, the distance between first and second sensors may preferably be more than one meter, further preferably more than two meters, further preferred, more than three meters.

A wireless vehicular sensor network may include the first and/or the second wireless vehicular sensor node. Both may preferably be included in the same wireless vehicular sensor network.

Figure 15:
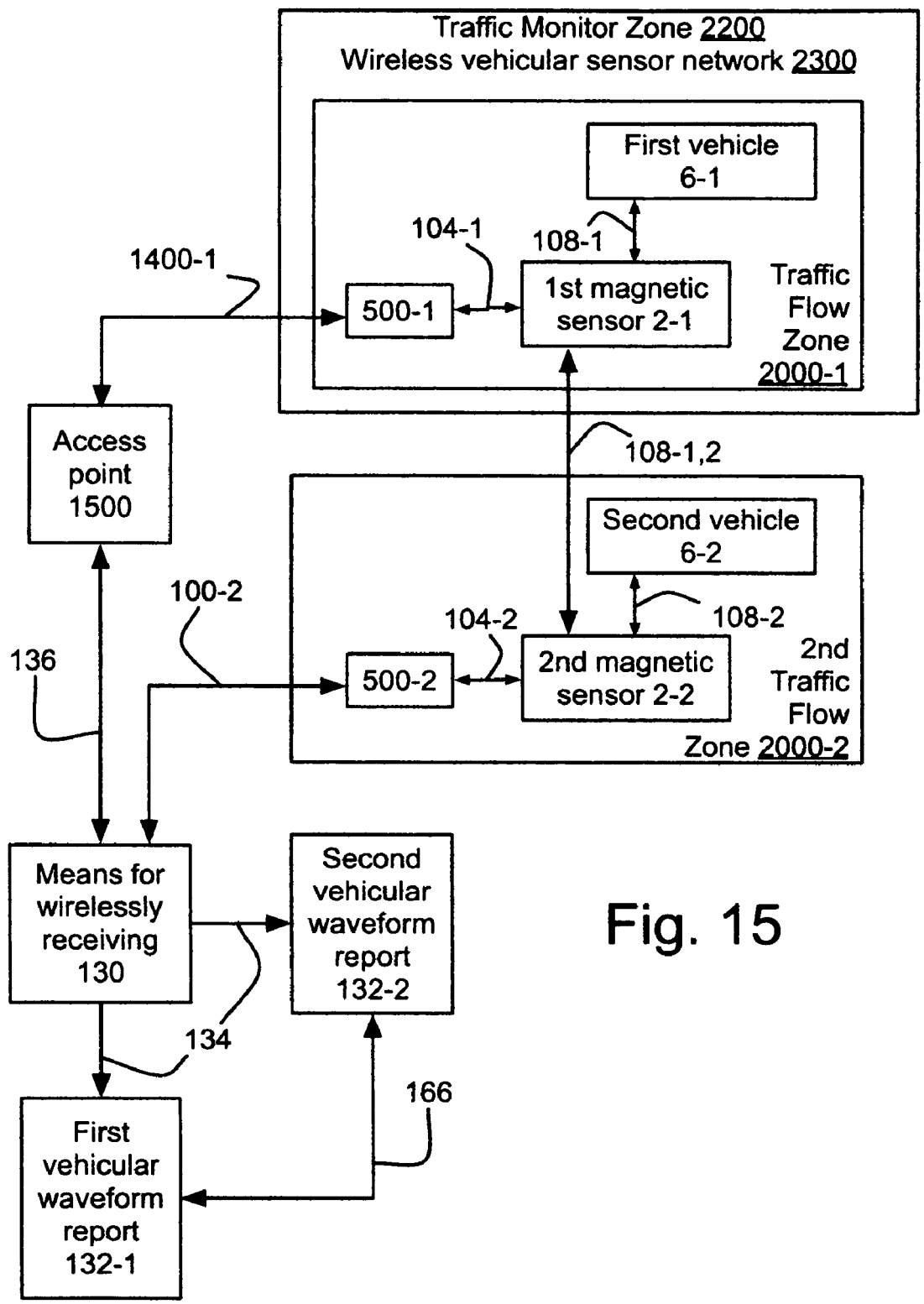

A wireless vehicular sensor network 2300 may include at least one of the first wireless vehicular sensor node 500-1 and the second wireless vehicular sensor node 500-2. By way of example, the wireless vehicular sensor network may include exactly one wireless vehicular sensor node used for receiving the vehicular waveform report, as shown in FIG. 15 with network including the first wireless vehicular sensor node. Both may preferably be included in the same wireless vehicular sensor network, as shown in FIG. 13B.

The wireless vehicular sensor network may further include an access point communicating with both the first wireless vehicular sensor node and the second wireless vehicular sensor node. The wireless vehicular sensor network may further include an access point 1500 communicating with both the first wireless vehicular sensor node and the second wireless vehicular sensor node as shown in FIG. 14.

Figure 16:
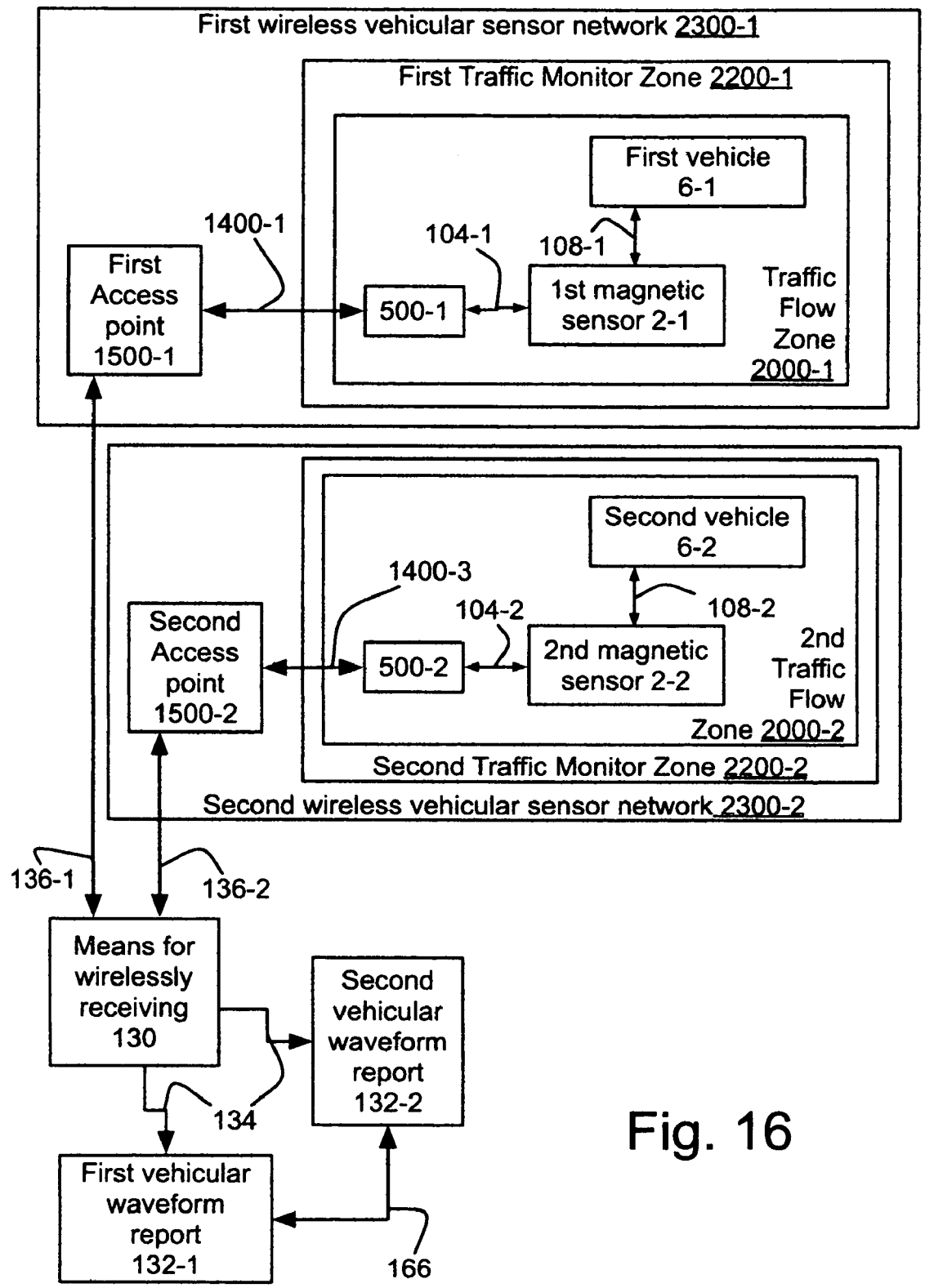

FIG. 16 shows another example of wireless vehicular sensor networks and access points. The first wireless vehicular sensor network 2300-1 includes the first wireless vehicular sensor node wirelessly communicating with a first access point 1500-1. The second wireless vehicular sensor network 2300-2 includes the second wireless vehicular sensor node wirelessly communicating with a second access point 1500-2.

Wirelessly receiving the first, time-synchronized, and often time-interleaved with the second, vehicular waveform report may further include wirelessly receiving via the access point. This may include wirelessly receiving via the access point 1500 the first vehicular waveform report 132-1 from the first wireless vehicular sensor node 500-1, time-synchronized, and often time-interleaved with the second vehicular waveform report 132-2 from the second wireless vehicular sensor node 500-2.

Figure 14:
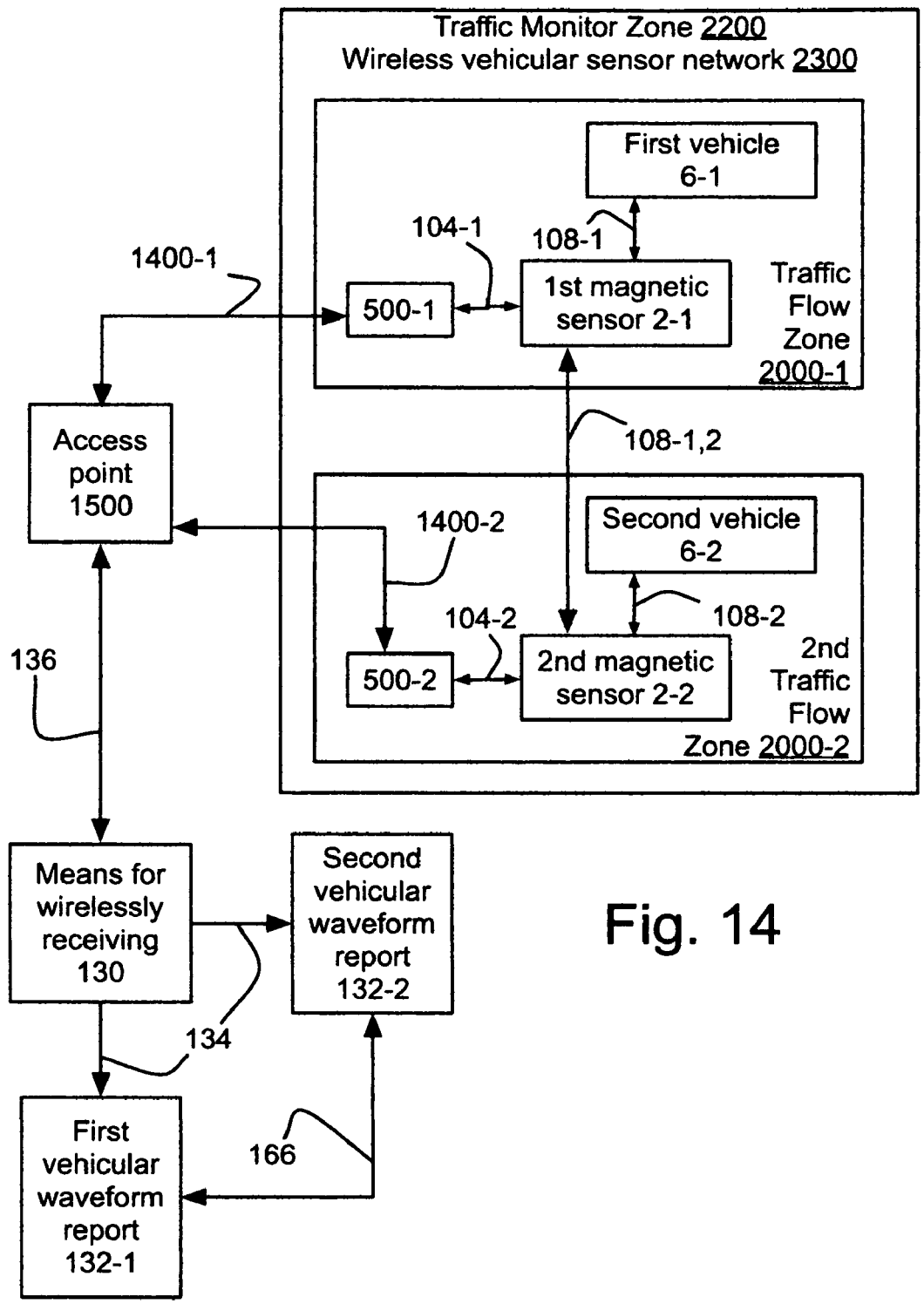

By way of example, the means for wirelessly receiving the first, time synchronized 166 and time-interleaved 134 with the second, vehicular waveform report may include the means for wirelessly receiving 130 via 136 the access point 1500 the first vehicular waveform report 132-1 from the first wireless vehicular sensor node 500-1 time-interleaved with the second vehicular waveform report 132-2 from the second wireless vehicular sensor node 500-2, as in FIG. 14. The access point is first wireless network coupled 1400-1 to the first wireless vehicular sensor node 500-1. And the access point is second wireless network coupled 1400-2 to the second wireless vehicular sensor node 500-2.

Another example, the means for wirelessly receiving 130 the first, time synchronized 166 and time-interleaved 134 with the second, vehicular waveform report may further include an access point 1500 for wirelessly communicating with one but not both wireless vehicular sensor nodes, as shown in FIG. 15. Means for wirelessly receiving 130 uses via 136 with the access point for the first vehicular waveform report 132-1 from the first wireless vehicular sensor node 500-1. The means for receiving is second wirelessly communicating 102-2 with the second wireless vehicular sensor node 500-2 for the second vehicular waveform report 132-2.

Another example, the means for wirelessly receiving 130 the first, time synchronized 166 and time-interleaved 134 with the second, vehicular waveform report may further include using two access points, for two wireless vehicular sensor networks to wirelessly communication with the wireless vehicular sensor nodes, as shown in FIG. 16. Means for wirelessly receiving 130 uses first via 136-1 with the first access point 1500-1 for the first vehicular waveform report 132-1 from the first wireless vehicular sensor node 500-1. The means for wirelessly receiving uses second via 136-2 with the second access point 1500-2 the second vehicular waveform report 132-2 from the second wireless vehicular sensor node 500-2.

The means for wirelessly receiving may include at least one instance of at least one of a computer, a finite state machine, and an inferential engine. The instance at least partly implements the method by wirelessly communicating with at least one of the wireless vehicular sensor nodes. The instance may communicate with the wireless vehicular sensor nodes via an access point.

The access point may include the means for wirelessly receiving. The access point may be a base station communicating with at least one of the first wireless vehicular sensor node and the second wireless vehicular sensor node.

By way of example, the means for wirelessly receiving 130 may include at least one instance of a computer 12 at least partly implementing the method as shown in FIG. 17B by communicating via a receiver 18 with the first wireless vehicular sensor node 500-1 to wirelessly receive 102-1 the first vehicular waveform report 132-1, and with the second wireless vehicular sensor node 500-2 to second wirelessly receive 102-2 the second vehicular waveform report 132-2.

The computer 12 is preferably accessibly coupled 16 with a memory 14 including at least one program step included in a program system 600 directing the computer in implementing the method.

The computer 12 communicating with the first and second wireless vehicular sensor nodes may further include the computer communicating via the access point 1500 with the first wireless vehicular sensor node 500-1 to wirelessly receive 102-1 the first vehicular waveform report 132-1, and with the second wireless vehicular sensor node 500-2 to second wirelessly receive 102-2 the second vehicular waveform report 132-2.

Another example, the means for wirelessly receiving 130 may include at least one instance of a finite state machine 26 at least partly implementing the method as shown in FIG. 17C by communicating via the receiver with the first wireless vehicular sensor node to wirelessly receive the first vehicular waveform report, and with the second wireless vehicular sensor node to wirelessly receive the second vehicular waveform report.

The finite state machine 26 communicating with the wireless vehicular sensor nodes may further include the finite state machine communicating via the access point 1500 with the first wireless vehicular sensor node 500-1 to wirelessly receive 102-1 the first vehicular waveform report 132-1, and with the second wireless vehicular sensor node 500-2 to second wirelessly receive 102-2 the second vehicular waveform report 132-2.

Another example, the means for wirelessly receiving 130 may include at least one instance of an inferential engine 24 at least partly implementing the method as shown in FIG. 17D by communicating via the receiver with the first wireless vehicular sensor node to wirelessly receive the first vehicular waveform report, and with the second wireless vehicular sensor node to wirelessly receive the second vehicular waveform report.

The inferential engine 24 communicating with the wireless vehicular sensor nodes may further include the inferential engine communicating via the access point 1500 with the first wireless vehicular sensor node 500-1 to wirelessly receive 102-1 the first vehicular waveform report 132-1, and with the second wireless vehicular sensor node 500-2 to second wirelessly receive 102-2 the second vehicular waveform report 132-2.

The receiver 18 shown in FIGS. 17B to 17D may preferably be part of a transmitter/receiver, known herein as a transceiver.

The invention may use more than two wireless vehicular sensor nodes, and include any combination of time-interleaved reception of vehicular waveform reports from wireless vehicular sensor nodes.

Figure 27:
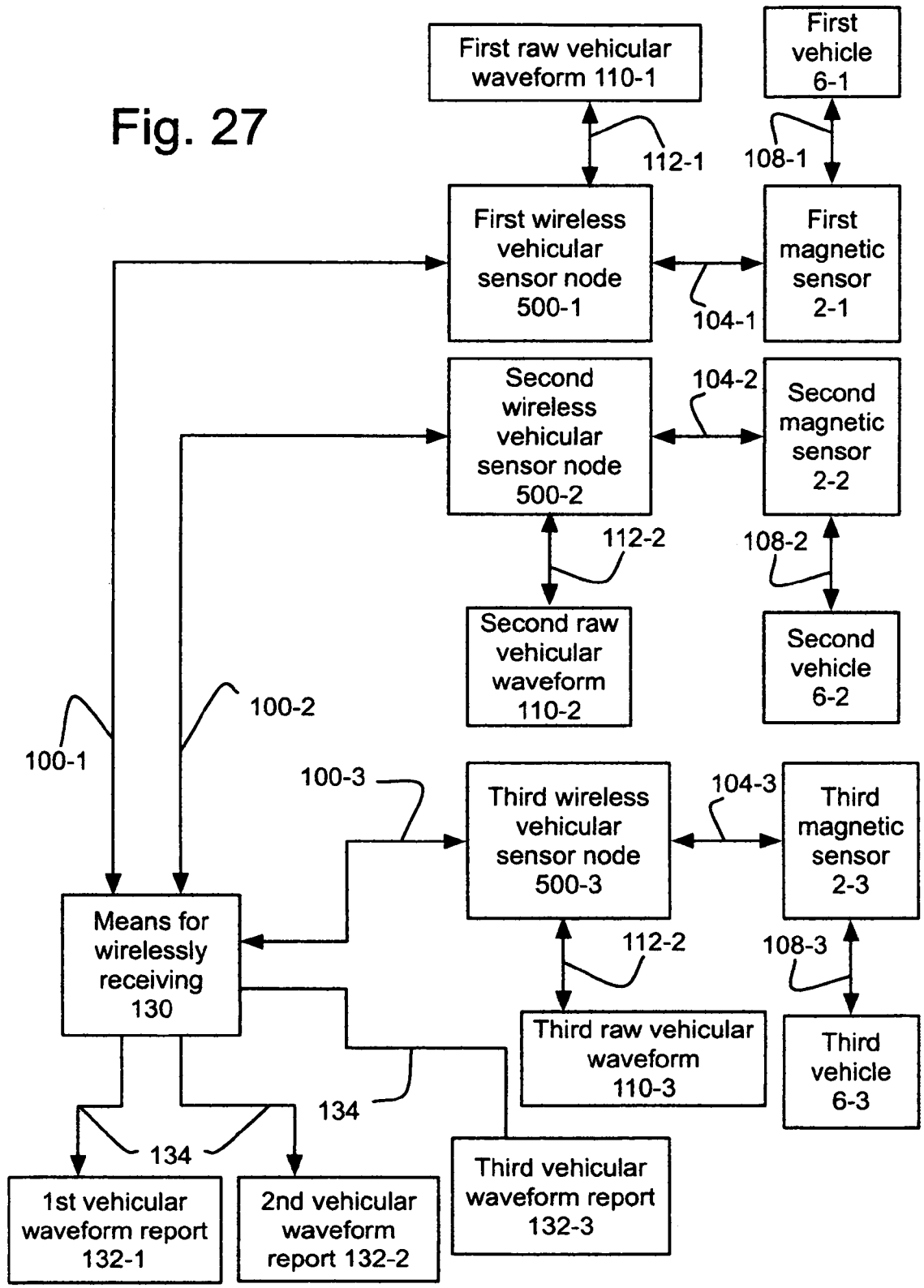
FIG. 27 shows an example of the means for receiving wirelessly communicating with more than two wireless vehicular sensor nodes in accord with the invention.

By way of example, consider FIG. 27, which is a refinement of FIG. 1A. The means for receiving 130 may further third wirelessly communicate 100-3 with a third wireless vehicular sensor node 500-3. The third wireless vehicular sensor node may third operate 104-3 a third magnetic sensor 2-3. The third vehicular sensor node may preferably report the presence of a third vehicle 6-3 when it is within a third distance 108-3 via the third wireless communication path 100-3 to the means for receiving 130 to create the third vehicular waveform report 132-3. The third vehicular waveform report 132-3 approximates the third raw vehicular sensor waveform 110-3 observed by the third magnetic sensor at the third wireless vehicular sensor node based upon the presence of the third vehicle.

The following are examples of combinations of time-interleaved reception of the vehicular waveform reports.

Wirelessly receiving 130 the first vehicular waveform report 132-1 from the first wireless vehicular sensor node 500-1 time-interleaved 134 with the third vehicular waveform report 132-3 from a third wireless vehicular sensor node 500-3.

Wirelessly receiving 130 the second vehicular waveform report 132-2 from the second wireless vehicular sensor node 500-2 time-interleaved 134 with the third vehicular waveform report 132-3 from a third wireless vehicular sensor node 500-3.

Wirelessly receiving 130 the first vehicular waveform report 132-1 from the first wireless vehicular sensor node 500-1 time-interleaved 134 with a second vehicular waveform report 132-2 from the second wireless vehicular sensor node 500-2, and time-interleaved 134 with the third vehicular waveform report 132-3 from the third wireless vehicular sensor node 500-3.

Wirelessly receiving the time-interleaved vehicular waveform reports, may further include wirelessly receiving the time-interleaved vehicular waveform reports, when the observed vehicles are each within a distance of the corresponding magnetic sensors.

For example, wirelessly receiving the first time-interleaved with the second vehicular waveform report, may further include wirelessly receiving 130 the first vehicular waveform report 132-1 from the first wireless vehicular sensor node 500-1 time-interleaved 134 with the second vehicular waveform report 132-2 from the second wireless vehicular sensor node 500-2, when the first vehicle 6-1 is within a first distance 108-1 of the first magnetic sensor 2-1, and when the second vehicle 6-2 is within a second distance 108-2 of the second magnetic sensor 2-2, as shown in FIGS. 6A and 13A to 4.

The first distance 108-1 may be essentially the same as the second distance 108-2. Alternatively, the first distance may be distinct from the second distance. Both the first distance and the second distance may be at most three meters. Further preferred, both may be at most two meters. Further, both may be at most one meter.

Wirelessly receiving the time-interleaved vehicular waveform reports, may further include wirelessly receiving the time-interleaved vehicular waveform reports, when the observed vehicles are each within a distance of the corresponding magnetic sensors. The node may already determine when a vehicle is close enough, by determining a rising edge and/or a falling edge of a vehicular sensor waveform, which is the result of the vehicle moving near that node. During normal traffic monitoring operations, the node preferably transmits a report of only the waveform characteristics, which may include the rising edge and the falling edge. It may be further preferred that the node report the raw vehicular sensor waveform from a predetermined time before the rising edge until a second predetermined time after the falling edge.

The invention includes the ability to control turning on and off the vehicular waveform report 132-1 and 132-2 from the wireless vehicular sensor nodes 100-1 and 100-2 based upon whether a vehicle 6 is present or not present. These reports preferably start shortly before the rising edge 108 and continue until shortly after the falling edge 110. By way of example, the operation of a wireless vehicular sensor node 500 may be discussed in terms of a program system 200, as shown in FIG. 20. The wireless vehicular sensor node may include a node computer 10-N node-accessibly coupled 16-N to a node memory 14-N. The program system preferably includes program steps residing in the node memory.

Some of the following figures show flowcharts of at least one method of the invention, which may include arrows with reference numbers. These arrows signify a flow of control, and sometimes data, supporting various implementations of the method. These include at least one the following: a program operation, or program thread, executing upon a computer; an inferential link in an inferential engine; a state transition in a finite state machine; and/or a dominant learned response within a neural network.

The operation of starting a flowchart refers to at least one of the following. Entering a subroutine or a macro instruction sequence in a computer. Entering into a deeper node of an inferential graph. Directing a state transition in a finite state machine, possibly while pushing a return state. And triggering a collection of neurons in a neural network. The operation of starting a flowchart is denoted by an oval with the word "Start" in it.

The operation of termination in a flowchart refers to at least one or more of the following. The completion of those operations, which may result in a subroutine return, traversal of a higher node in an inferential graph, popping of a previously stored state in a finite state machine, return to dormancy of the firing neurons of the neural network. The operation of terminating a flowchart is denoted by an oval with the word "Exit" in it.

A computer as used herein will include, but is not limited to, an instruction processor. The instruction processor includes at least one instruction processing element and at least one data processing element. Each data processing element is controlled by at least one instruction processing element.

FIG. 18 shows the wireless vehicular sensor node 500 including the following. Means for using 1000 a vehicle sensor state 104 from a magnetic sensor 2 to create a vehicular sensor waveform 106 based upon the presence of the vehicle 6. And means for operating 140 a transmitter 22 to send the report 180 across at least one wireless physical transport 1510 to the access point 1500 included the wireless vehicular sensor network 2300, to approximate the vehicular sensor waveform 106 at the access point. The report may be sent directly to the access point 1500, or via an intermediate node 580. The intermediate node may act as a repeater and/or signal converter, and may or may not function as a vehicular sensor node. The report may be generated by the means for using 1000 in certain embodiments of the invention.

The wireless vehicular sensor node 500 may include the following. Means for maintaining 300 a clock count 36, a task trigger 38, and a task identifier 34. Means for controlling a power source, may preferably distribute electrical power to the means for using 1000 and the means for operating 140, based upon the task trigger and the task identifier. The means for using may be provided operating power, when the magnetic sensor 2 is used to create the vehicular sensor waveform and/or to create its waveform characteristic 120 and/or its second waveform characteristic 120-2. These may then be preferably used to generate the report 180. The means for operating 140 may be provided operating power, when the report is to be sent to the access point 1500 across at least one wireless physical transport 1510, either directly, or via the intermediate node 580.

The wireless vehicular sensor node 500 may further preferably include: means for maintaining the clock count to create the task trigger and the task identifier. The means for operating 140 the transceiver 20 and means for using 1000 are directed by the task identifier 34, when the task trigger 38 is active. One or more computers, field programmable logic devices, and/or finite state machines may be included to implement these means.

FIG. 20 shows an alternative, often-preferred refinement, of the wireless vehicular sensor node 500 of FIG. 18. The means for controlling the power source provides a computer power to a node computer 10-N, a memory power to a node memory 14-N node accessibly coupled 14-N to the node computer. The means for controlling also provides a vehicle sensor power to the magnetic sensor 2 and a transceiver power to the transceiver 20, which preferably includes the transmitter 22 of FIG. 18. The node computer 10-N is first communicatively coupled 12 to the magnetic sensor 2, and is second communicatively coupled 16 to the transceiver. In certain further preferred embodiments, the node computer and a clock timer implementing the means for maintaining 300 may be housed in a single integrated circuit. In certain embodiments, the means for maintaining may be referred to as a clock timer.

Figure 8A:
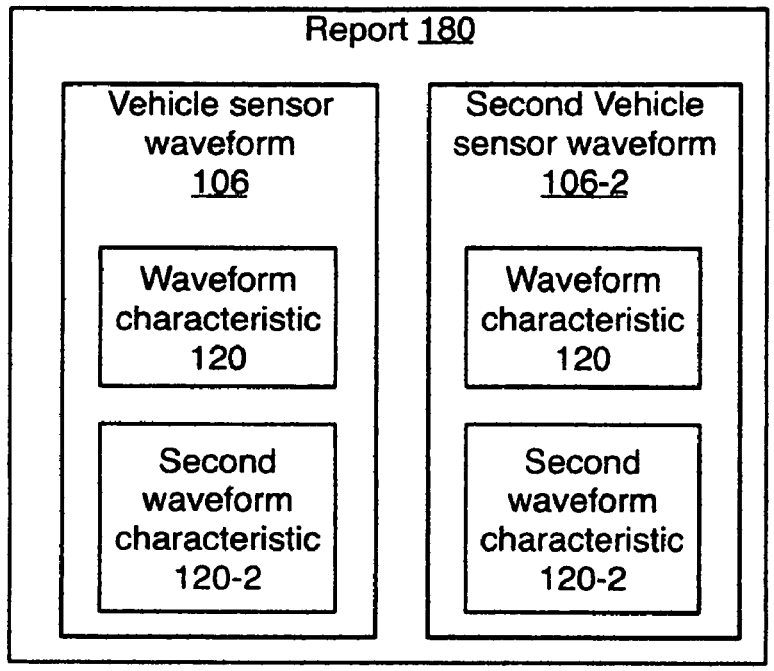
FIGS. 8A and 8B show a simplified version of the report for traffic monitoring operations, and its acknowledgement.
Figure 8B:
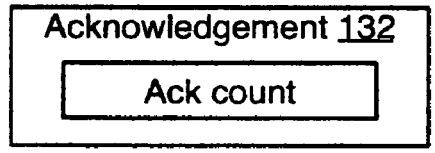
Figure 8C:
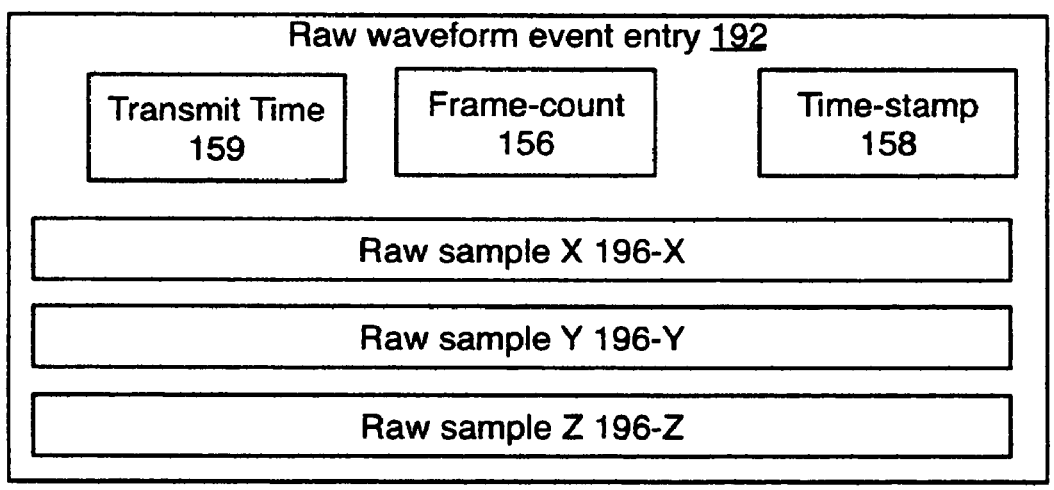
FIG. 8C shows the long report further including the transmit time for the long report, in support of the second approach to time synchronization.
Figure 22A:
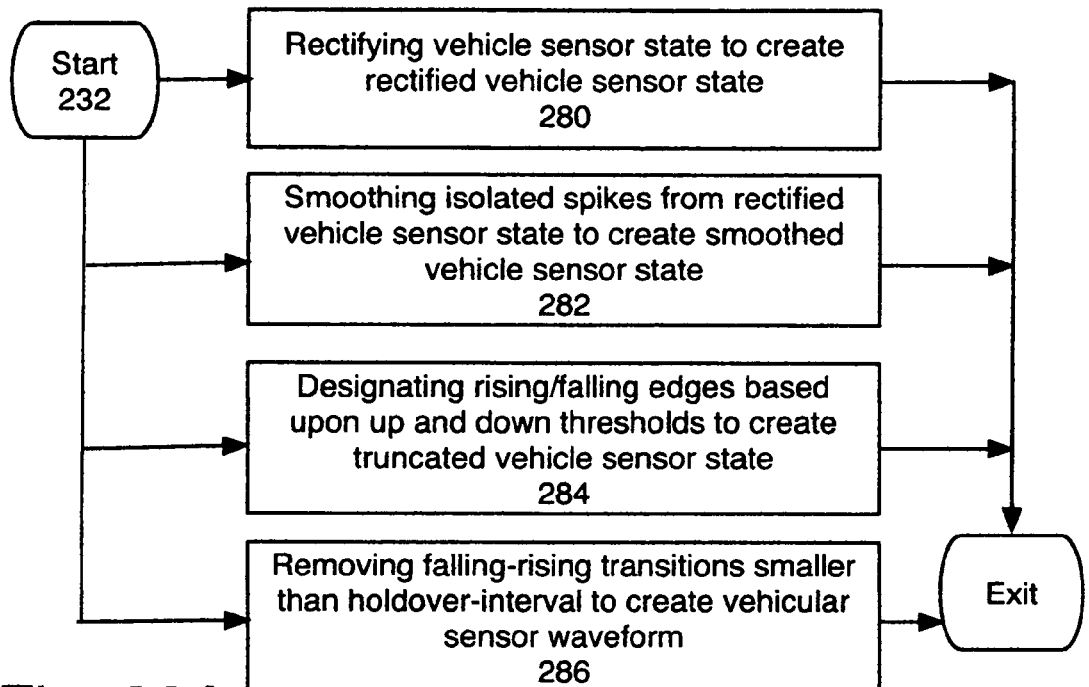
Figure 22B:
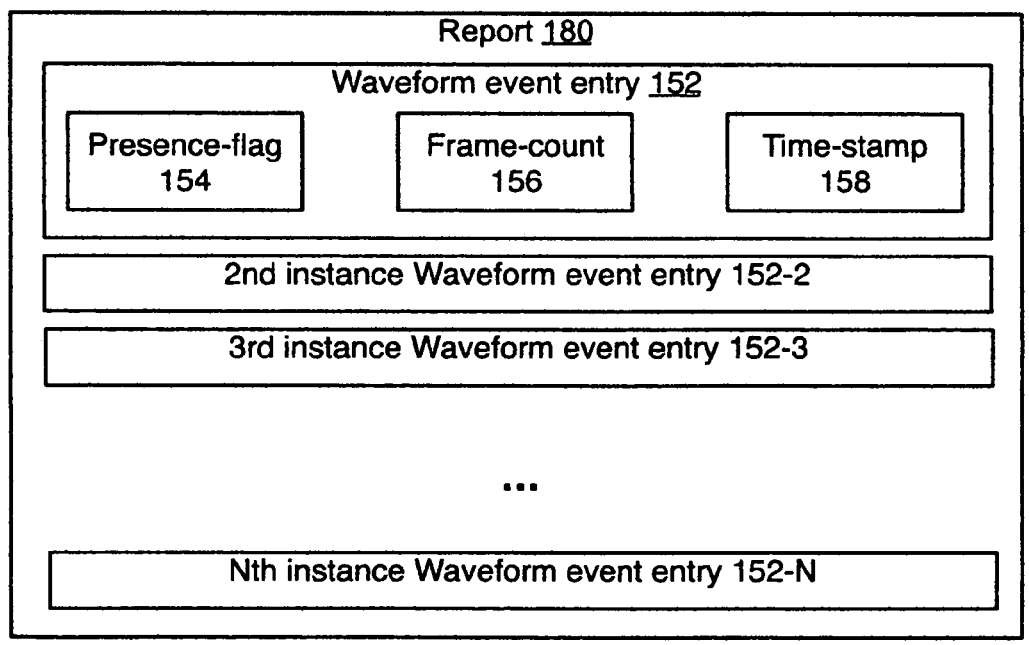
FIG. 22B shows an example of the report used in traffic monitoring activities.
Figure 23A:
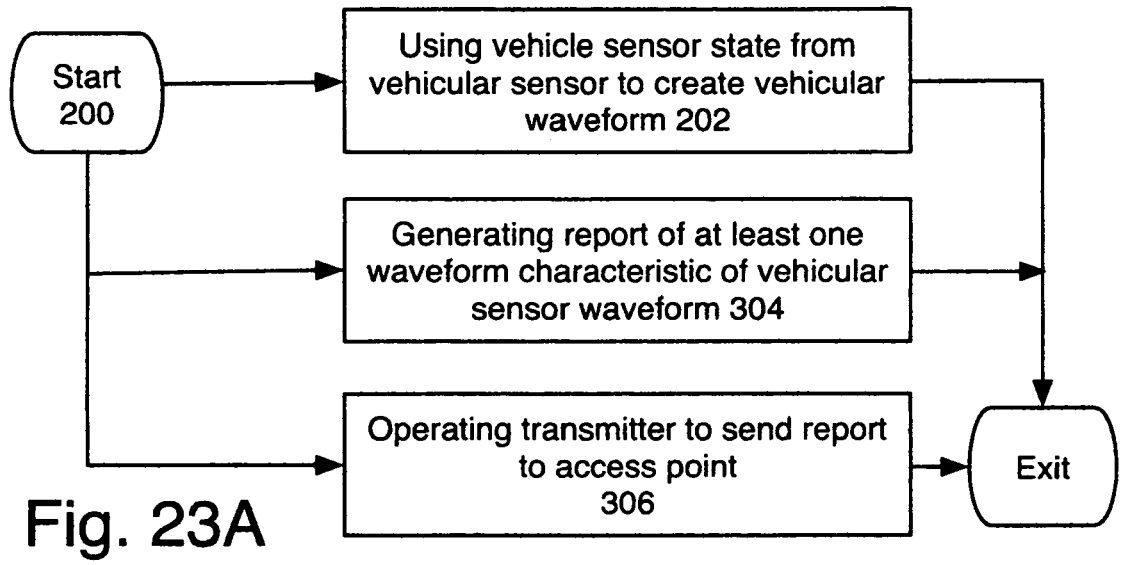
FIGS. 23A to 24C show some details of operating a wireless vehicular sensor node for traffic monitoring operations.
Figure 23B:
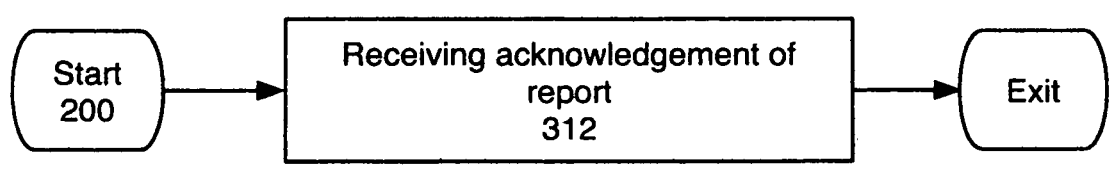
Figure 23C:
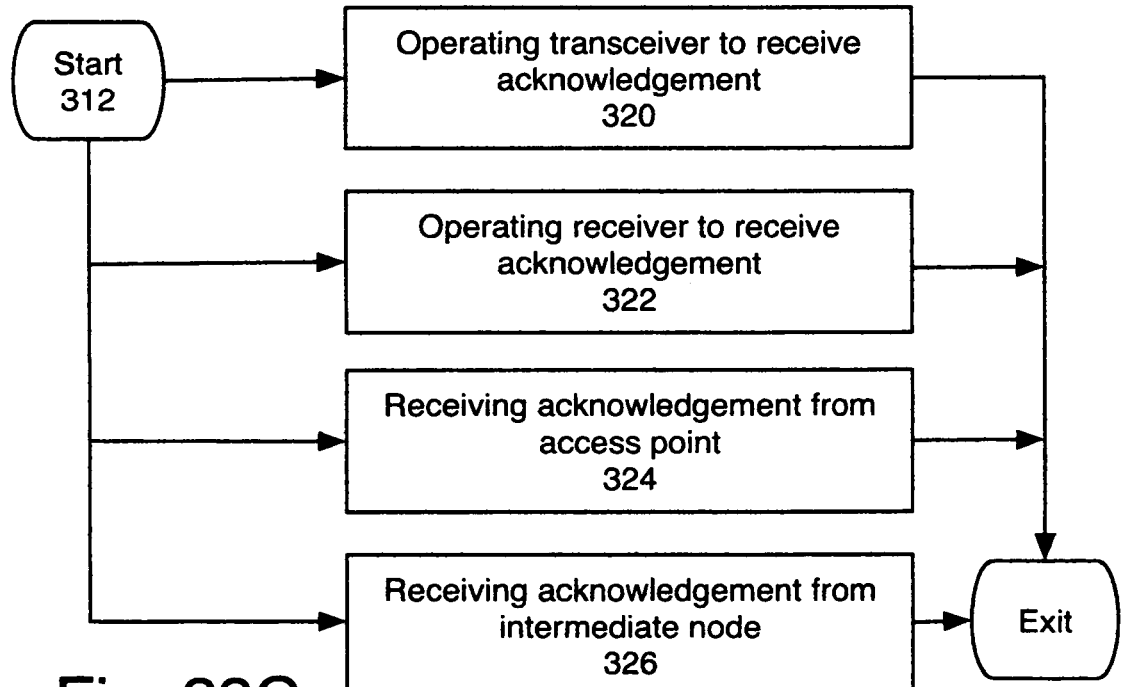

FIGS. 21A to 23C show aspects of the invention's method of responding to the presence of a motor vehicle in terms of the program system 200 of FIG. 20 to generate and transmit the report 180 of FIG. 8A and preferably, of FIG. 23B.

Figure 21A:
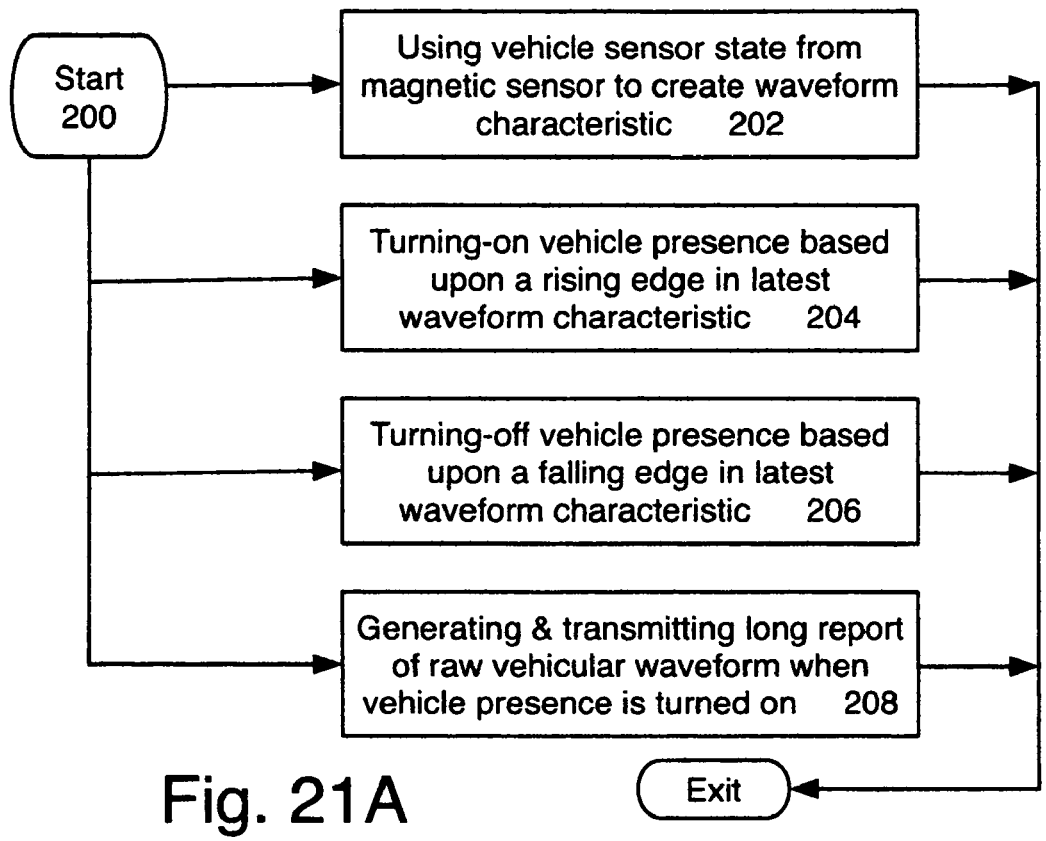

The wireless vehicular sensor node 500 of FIG. 20 may operate as implemented by the program system as shown in FIG. 21A. Operation 202 may support using the vehicle sensor state 114 from the magnetic sensor 2 to create a waveform characteristic 120. The waveform characteristic may preferably be a rising edge 118-R or a falling edge 118-F, as shown and discussed in FIGS. 12A to 12C. Operation 204 supports turning-on the vehicle presence based upon a rising edge in the latest waveform characteristic. Operation 206 supports turning-off the vehicle presence based upon a falling edge in the latest waveform characteristic. Operation 208 supports generating and transmitting a long report 190 of the raw vehicular waveform 110. Recall that the long report was discussed regarding FIGS. 9A, 9B and 8C.

Figure 21B:
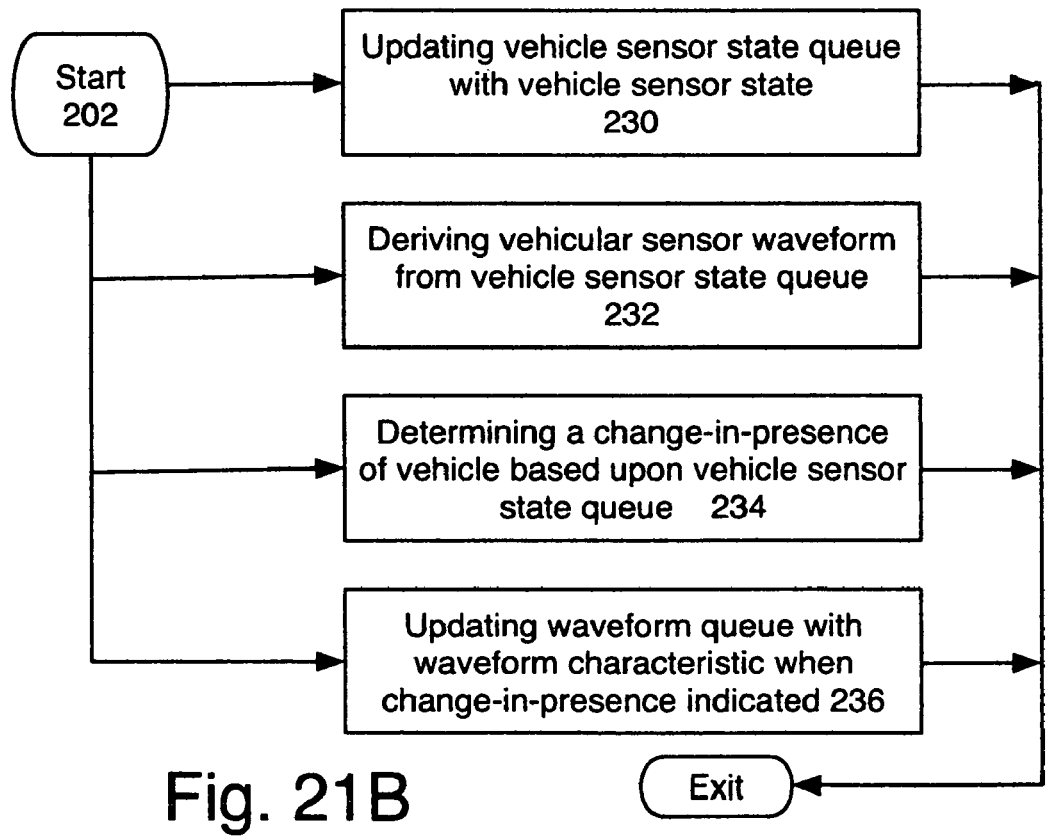

FIG. 21B shows some details of operation 202 of FIG. 21A, further using the vehicle sensor state 114 from the magnetic sensor 2 to create a waveform characteristic 120. Operation 230 supports updating the vehicle sensor state queue 122 of FIG. 20 with the vehicle sensor state. Operation 232 supports deriving the vehicular sensor waveform 106 from the vehicle sensor state queue. Operation 234 supports determining a change-in-presence 126 of the vehicle 6 based upon the vehicle sensor state queue. Operation 236 supports updating the waveform. queue 124 with the waveform characteristic when the change-in-presence is indicated.

Figure 10A:
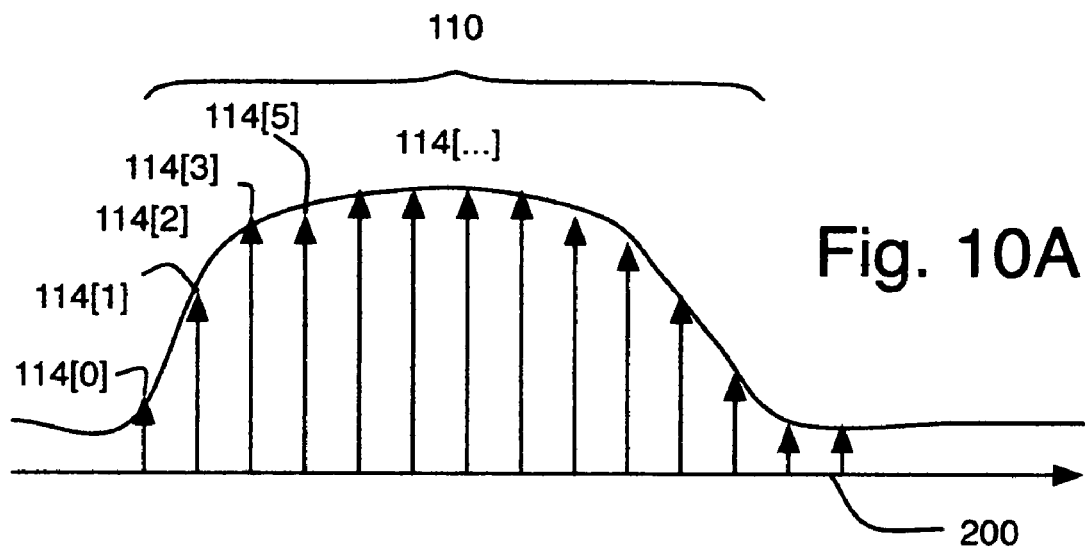
FIGS. 10A to 12C show an example of finding the rising edge and falling edge of the raw vehicular waveform.
Figure 10B:
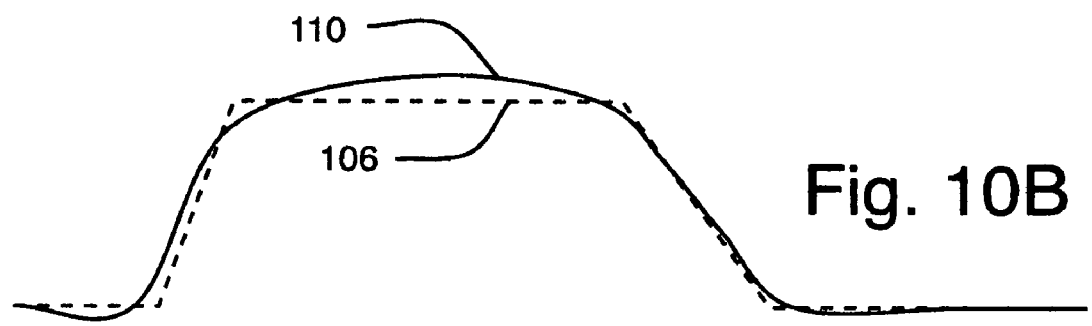
Figure 10C:
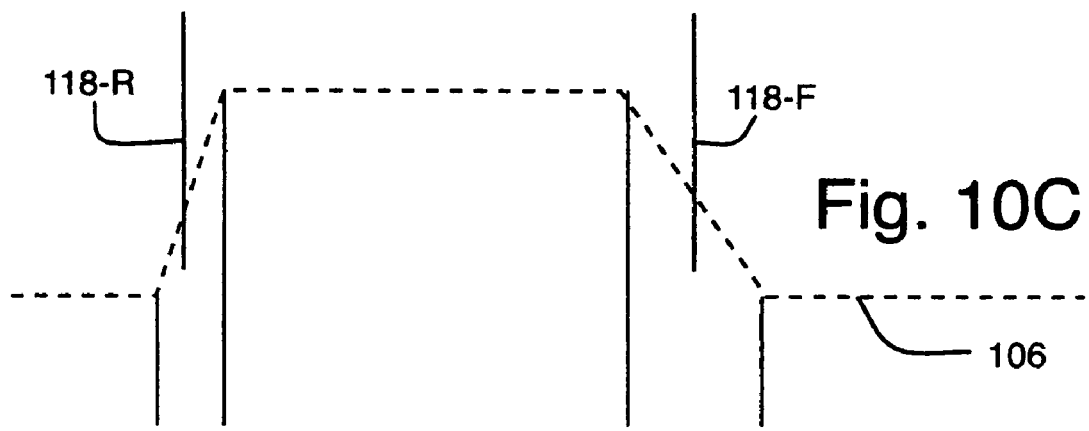

FIG. 10A to 10C show various aspects of the vehicular sensor waveform 106 created by the invention in response to the presence of a vehicle 6, as shown in FIGS. 18 and 20. A vehicle sensor state 104, is collected over time 200, to create the vehicular sensor waveform, which may preferably be represented by at least one waveform characteristic 120. Such a waveform characteristic may represent a rising edge 108, a falling edge 110, a waveform midpoint 114, and/or a waveform duration 112. In traffic control situations, reporting the rising edge and/or falling edge can help indicate length of a vehicle, which can further help in estimating vehicle velocity.

Figure 11A:
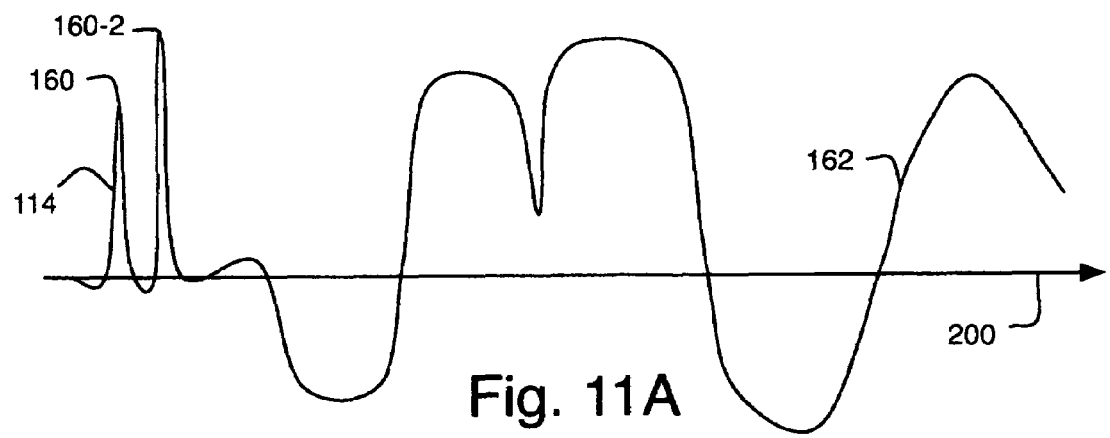

Often, the vehicle sensor state 104, when collected over time 200, is more chaotic, as shown in FIG. 11A. There may be an isolated spike 160, or more than one, as shown by the second isolated spike 160-2. As used herein, an isolated spike will refer to one of a small number of vehicle sensor states, that are large, and surrounded in time by small values of the vehicle sensor state. The small number is shown as one value the isolated spike 204, and two values in the second isolated spike 204-2. In certain embodiments, the small number may be as large as three to five.

The vehicle sensor state 104 may vary quickly in sign, even while one vehicle is passing near the vehicular sensor 2. Also confusing the picture, a second vehicle passing soon after the first vehicle may quickly stimulate the vehicular sensor 2 a second time 162.

Figure 11B:
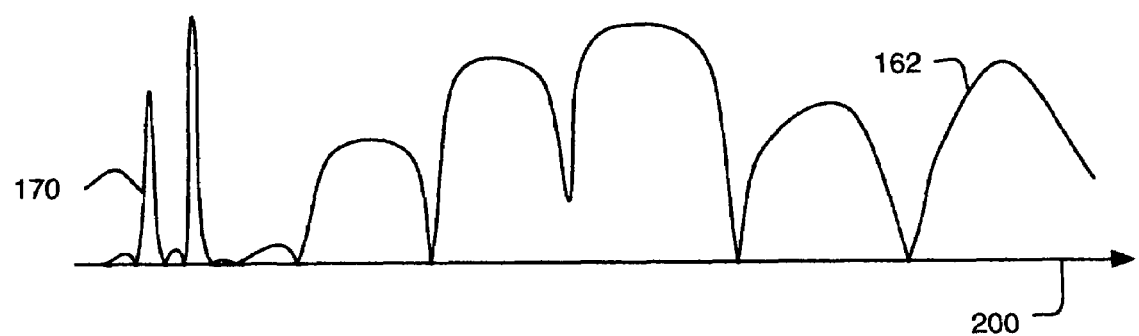
Figure 11C:
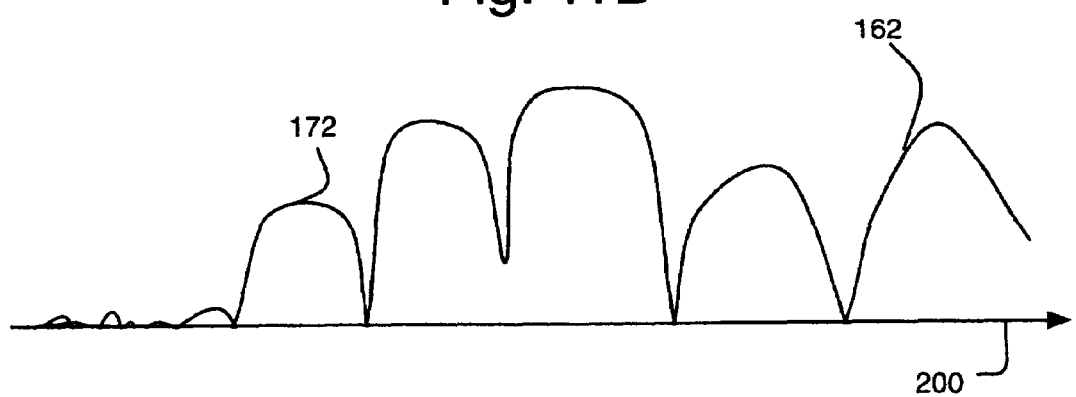
Figure 12A:
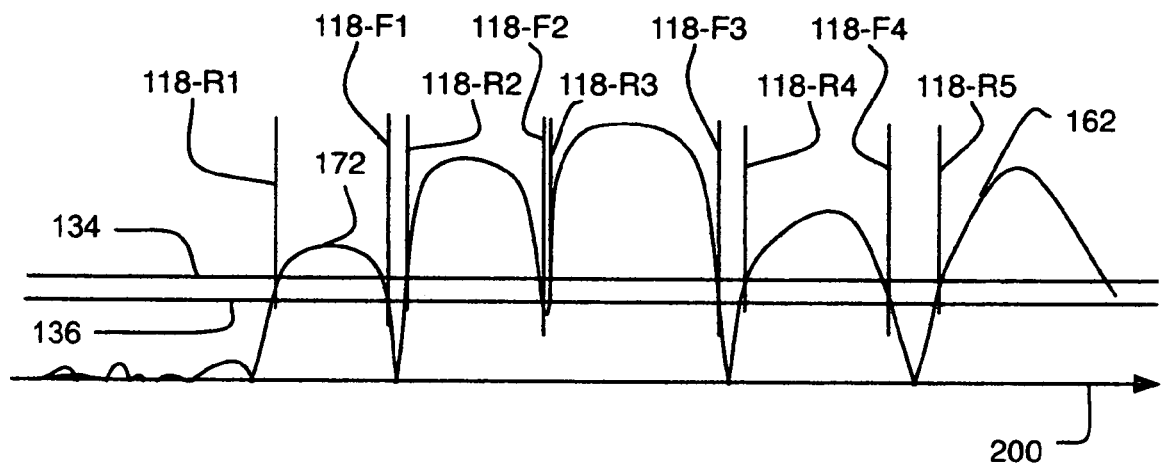
Figure 12B:
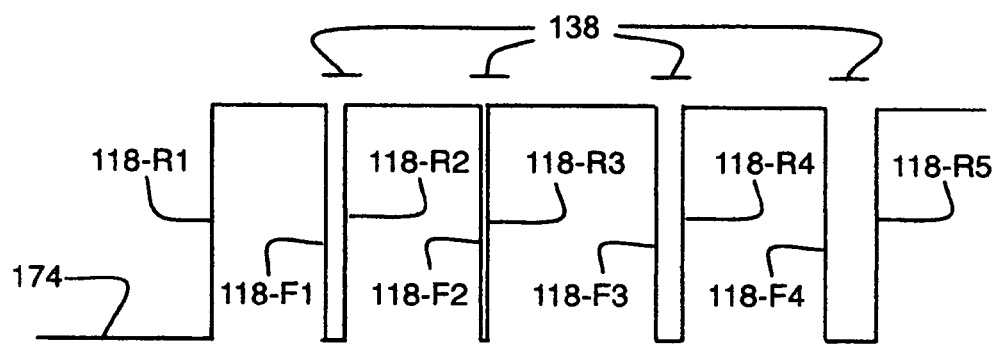
Figure 12C:
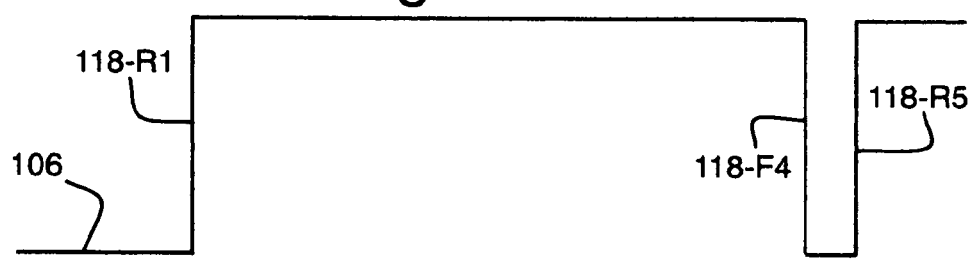

The invention includes the vehicle sensor state 104, shown in FIG. 22A as details of operation 232 of FIG. 21B, deriving the vehicular sensor waveform 106 from the vehicle sensor state queue 122. Operation 280 supports rectifying the vehicle sensor state 104 of FIG. 11A to create the rectified vehicle sensor state 202 of FIG. 11B. Operation 282 supports smoothing an isolated spike 160 in the rectified vehicle sensor state creates the smoothed vehicle sensor state 172 of FIG. 11C. Operation 284 supports designating at least one rising edge 118-R1 and/or at least one falling edge 118-F1 as shown in FIG. 12A of the smoothed vehicle sensor state 172 based upon the up-threshold 184 and the down-threshold 186 of FIG. 20 to create the truncated vehicle sensor state 185 of FIG. 12B. And operation 286 supports removing falling-rising transitions smaller than the holdover-interval 138 in the truncated vehicle sensor state to create a preferred embodiment of the vehicular sensor waveform 106 shown in FIG. 12C.

This method of signal conditioning may or may not use additional memory to perform its operations. It removes false positives caused by the isolated spike 160. It also removes false positives caused by the vehicle sensor state 104 varying in sign while one vehicle passes near the magnetic sensor 2.

The up-threshold 184 is often preferred to be larger than the down-threshold 136. The up-threshold is preferred to be about 40 milli-gauss. The down-threshold is preferred to be about 22 milli-gauss. These values for the up-threshold and the down-threshold are typical for North America, and may be calibrated differently elsewhere. The holdover-interval 138 is often preferred between 10 milliseconds (ms) and 300 ms. The units of the up-threshold and down-threshold are in the units of the magnetic sensor 2. The units of the holdover-interval are preferably in terms of time steps of a time division multiplexing scheme controlled by synchronization with the access point 1500 preferably acting to synchronize each wireless vehicular sensor node 500 in the wireless vehicular sensor network 2300. Often these units may be preferred to be in terms of $1/1024$ of a second, or roughly 1 ms.

By way of example, suppose a vehicle 6 approaches the wireless vehicular sensor node 500. The vehicular sensor state 104 is used to update the vehicle sensor state queue 122, as supported by operation 230 of FIG. 21B. The vehicular sensor waveform 106 is derived from the vehicle sensor state queue, as supported by operation 232 and discussed regarding FIG. 10A to 12C. A change-in-presence 126 of the vehicle is determined based the vehicular sensor waveform, as supported by operation 234. Usually this would be determined by a rising edge 108 in the vehicular sensor waveform. The waveform queue 124 is updated with a waveform characteristic 120, when the change-in-presence is indicated. Preferably, this waveform characteristic would indicate the rising edge.

To continue the example, suppose the vehicle 6 moves away from wireless vehicular sensor node 500 at a later time. The operations of FIG. 21B would support using the vehicle sensor state 104 in much the same way. The change-in-presence 126 of the vehicle is determined based the vehicular sensor waveform 106, as supported by operation 234, and would preferably be determined by a falling edge 110 in the vehicular sensor waveform. The waveform queue 124 is updated with a waveform characteristic 120, when the change-in-presence is indicated. Preferably, this waveform characteristic would indicate the falling edge.

Figure 24A:
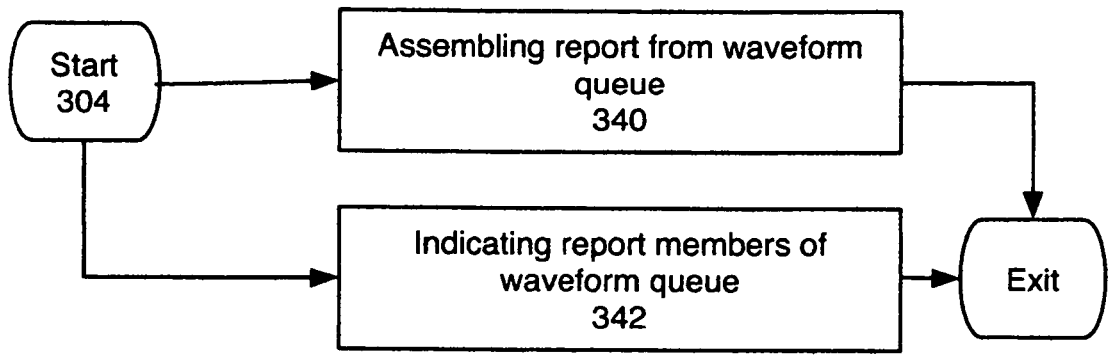

The operation 304 of FIG. 70A, generating the report 180, may further include the operations of FIG. 24A. Operation 340 supports assembling the report from the waveform queue 124. Operation 342 supports indicating report members of the waveform queue.

Figure 24B:
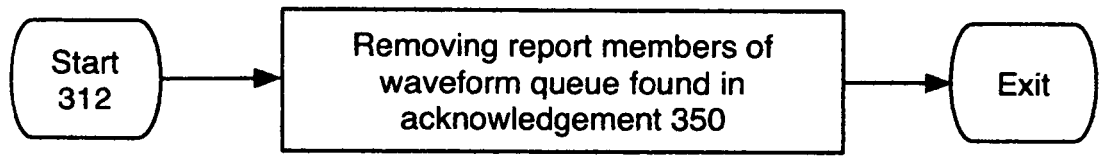

The operation 312 of FIG. 23B, receiving the acknowledgement 182, may further include the operation of FIG. 24B. Operation 350 supports removing report members of the waveform queue 124 found in the acknowledgement.

Figure 24C:
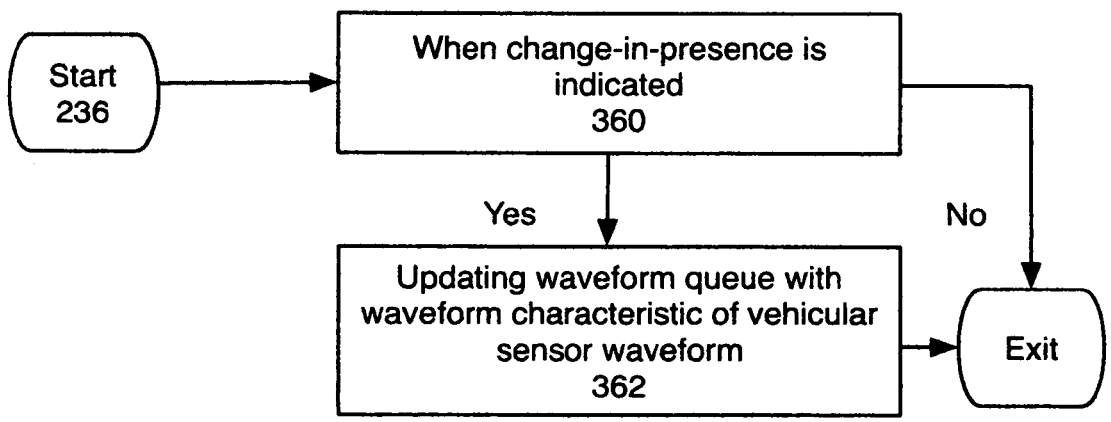

The operation 236 of FIG. 21B may include the operations of FIG. 24C. Operation 360 supports determining when the change-in-presence 126 is indicated. When this is "No", the operations of this flowchart terminate. When "Yes", the operation 362 supports update the waveform queue 124 with at least one waveform characteristic 120 of the vehicular sensor waveform 106.

The wireless vehicular sensor node 500 includes a magnetic sensor 2, preferably having a primary sensing axis 4 for sensing the presence of a vehicle 6, as shown in FIG. 20, and used to create the vehicle sensor state 114. The magnetic sensor may preferably employ a magneto-resistive effect and preferably includes a more than one axis magneto-resistive sensor to create a vehicle sensor state.

By way of example, the magnetic sensor 2 may include a two axis magneto-resistive sensor. A two axis magneto-resistive sensor may be used to create the vehicle sensor state as follows. The X-axis may be used to determine motion in the primary sensor axis 4. The Z-axis may be used to determine the presence or absence of a vehicle 6.

Another example, the magnetic sensor 2 may further preferably include a three axis magneto-resistive sensor. A three axis magneto-resistive sensor may be used to create the vehicle sensor state as follows. The X-axis may also be used to determine motion in a primary sensor axis 4. The Y-axis and Z-axis may be used to determine the presence or absence of a vehicle 6. In certain embodiments, the Euclidean distance in the Y-Z plane is compared to a threshold value, if greater, then the vehicle is present, otherwise, absent. The vehicular sensor may preferably include one of the magneto-resistive sensors manufactured by Honeywell.

Transmitting the report 180 and/or the long report 190 uses at least one wireless physical transport. The wireless physical transport may include any of an ultrasonic physical transport, a radio-frequency physical transport, and/or an infrared physical transport. Transmitting reports may be spread across a frequency band of the wireless physical transport. More particularly, the transmitting of reports may include a chirp and/or a spread spectrum burst across the frequency band.

The transmitter 22 of FIG. 18, and the transceiver 20 of FIG. 20 may communicate across a wireless physical transport 1510, which may include any combination of an ultrasonic physical transport, a radio physical transport, and an infrared physical transport. Different embodiments of the wireless vehicular sensor node 500 may use difference combinations of these transmitters and/or transceivers. Where useful, the wireless vehicular sensor node includes an antenna 28 coupling with the transceiver 20 as shown, or to a transmitter, which is not shown. The antenna may preferably be a patch antenna.

The report 180 and/or the long report 190 may further identify the wireless vehicular sensor node 500 originating the report. Transmitting the report may initiate a response across the wireless physical transport, preferably from an access point. The response may be an acknowledgement 182 of receiving the report.

FIG. 22B shows an example of the report 180 generated and sent by the wireless vehicular sensor node 500 of FIGS. 18 and 20. The report may include at least one waveform characteristic 120 of at least one vehicular sensor waveform 106 indicating a change in the presence of a vehicle 6 passing near the wireless vehicular sensor node. In certain embodiments, multiple waveform characteristics may be included in the report for at least one vehicular sensor waveform. Multiple vehicular sensor waveforms may be included in the report, each with at least one waveform characteristic. More than one vehicular sensor waveforms included in the report may include more than one waveform characteristic.

Consider the following example of a wireless vehicular sensor network 2300 including an access point 1500 and multiple wireless vehicular sensor nodes as shown in FIGS. 14, 5A, and 18. One preferred embodiment of this network includes using a synchronous time division multiple access protocol based upon the IEEE 802.15.4 communications protocol. The access point transmits a synchronization message, which is received by the wireless vehicular sensor nodes, and permits them to synchronize on a system clock. Preferably, a wireless vehicular sensor node 500 includes a means for maintaining 300 a clock count 36, task trigger 38, and task identifier 34, as shown in FIG. 20.

By way of example, the time division multiple access protocol may synchronize the wireless vehicular sensor network 2300 to operate based upon a frame with a frame time period. The frame time period may preferably approximate at least one second. The time division multiple access protocol may operate in terms of time slots with a time slot period. The time slot period may be preferred to be a fraction of the frame time period. The fraction may preferably be a power of two. The power of two may preferably be one over 1K, which refers to the number 1,024. The time slot period then approximates a millisecond. The wireless vehicular sensor network may further organize the report 180 in terms of a meta-frame, which may preferably have a meta-frame time period as a multiple of the frame time period. The meta-frame time period may preferably be thirty times the frame time period, representing a half of a minute.

The report 180 may preferably include a waveform event list 150 for the waveform characteristics observed by the wireless vehicular sensor node 500 during the current and/or most recent meta-frame as shown in FIG. 67B. A waveform characteristic 120 may be represented in the waveform event list by a waveform event entry 152 including the following. A presence-flag 154 indicating the presence or absence of the vehicle 6. A frame-count 156 indicating the frame in the meta-frame, and a time-stamp 158 indicating the time slot within that frame in which the waveform characteristic occurred.

The waveform event list 150 may include a fixed number N of instances of the waveform event entry 152, to minimize computing and power consumption at the wireless vehicular sensor node 500. The fixed number N may be a power of two, such as 32 or 20.

The presence-flag 154 may represent a vehicle 6 being present with the binary value '1', and the absence of the vehicle with a '0'. Alternatively, '0' may represent the presence of the vehicle. And its absence by '1'.

The frame-count 156 may be represented in a five bit field. The time-stamp 158 may be represented in a ten bit field.

The waveform event entry may be considered as a fixed point number, preferably 16 bits. When the waveform event entry has one of the values of 0x7FFF or 0xFFFF, it represents a non-event, no additional waveform characteristic 120 has been determined by the wireless vehicular sensor node.

The access point 1500 may be a base station 1500 communicating with at least one of the first wireless vehicular sensor node 500-1 and the second wireless vehicular sensor node 500-1.

Returning to discuss organization of the traffic monitoring activities and their relationship with this invention, FIG. 13A shows an example with the first magnetic sensor 2-1 and the second magnetic sensor 2-2 included in a first traffic flow zone 2000-1.

FIGS. 13B and 14 shows other examples with a traffic monitor zone 2200 superimposed of the wireless vehicular sensor network 2300, but the first magnetic sensor 2-1 monitoring the first vehicle 6-1 in the first traffic flow zone 2000-1, and the second magnetic sensor 2-2 monitors a second vehicle 6-2 in a second traffic flow zone 2000-2.

FIG. 15 shows another example with a traic monitor zone 2200 superimposed of the wireless vehicular sensor network 2300, which includes the first magnetic sensor 2-1 monitoring the first vehicle 6-1 in the first traffic flow zone, but does not include the second magnetic sensor 2-2 monitoring the second vehicle 6-2 in the second traffic flow zone 2000-2.

FIG. 16 shows another example with a first traffic monitor zone 2200-1 superimposed of the first wireless vehicular sensor network 2300-1, which includes the first magnetic sensor 2-1 monitoring the first vehicle 6-1 in the first traffic flow zone. A second traffic monitor zone 2200-1 is superimposed on the second wireless vehicular sensor network 2300-2, which includes the second magnetic sensor 2-2 monitoring the second vehicle 6-2 in the second traffic flow zone 2000-2.

The discussion of the operation of the means for wirelessly receiving 130 the time synchronized reports will proceed based upon the second program system 1200 as shown FIGS. 17B and 19. This is done strictly as a convenience to the reader, and is not meant to limit the scope of the invention. As pointed out earlier, embodiments may include finite state machines as shown in FIG. 17C and/or inferential engines as shown in FIG. 17D.

Figure 25A:
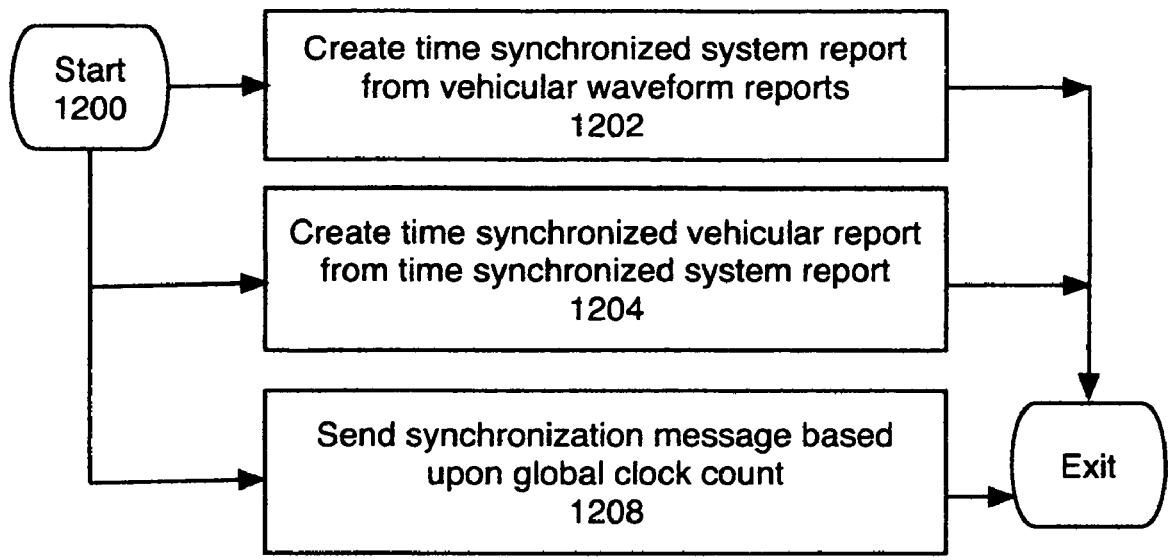
FIGS. 25A to 26C show some details of operating the means for receiving and/or the access point of the previous Figures.

The operation of the means for wirelessly receiving 130 may be implemented by the second program system 1200 of FIGS. 17B and/or 19 as program steps residing in the memory 14 and/or the access memory 14-A, which may implement the operations shown in FIG. 25A.

Operation 1202 supports creating the time synchronized system report 1080 from the first vehicular waveform report 132-1 and the second vehicular waveform report 132-2, as shown in FIG. 19. Implementations using more than two wireless vehicular sensor nodes, such as shown in FIGS. 2A to 3C, would preferably use all the vehicular waveform reports provided by those nodes.

Operation 1204 supports creating the time synchronized vehicular report 1090 from the time synchronized system report.

Optionally, the means for using may be included in the access point 1500, as previously discussed. Further, the access point may send a time synchronization message 160 to at least one of the wireless vehicular sensor nodes, as shown in FIG. 5A. Operation 1206 supports the sending of the time synchronization message based upon a global clock count 52, which is often based upon the action and state of a second clock timer 1022. The second clock timer typically includes, operates and/or maintains a second clock count 1036, a second task identifier 1034, and a second task trigger 1038. The operations of this flowchart may be further preferably implemented as separate tasks, which may be triggered using the second clock time to stimulate the computer 12 and/or the access computer 10-A.

During the initialization of the system using the means for wirelessly receiving 130, the time synchronization list 1070 is preferably setup to include a time offset for each of the wireless. vehicular sensor nodes which may send the long report 190. By way of example, the time synchronization list of FIG. 19 includes a first time offset 1072-1 for adjusting the long report received from the first wireless vehicular sensor node 500-1 and a second time offset 1072-2 for the second wireless vehicular sensor node 500-2.

Figure 25B:
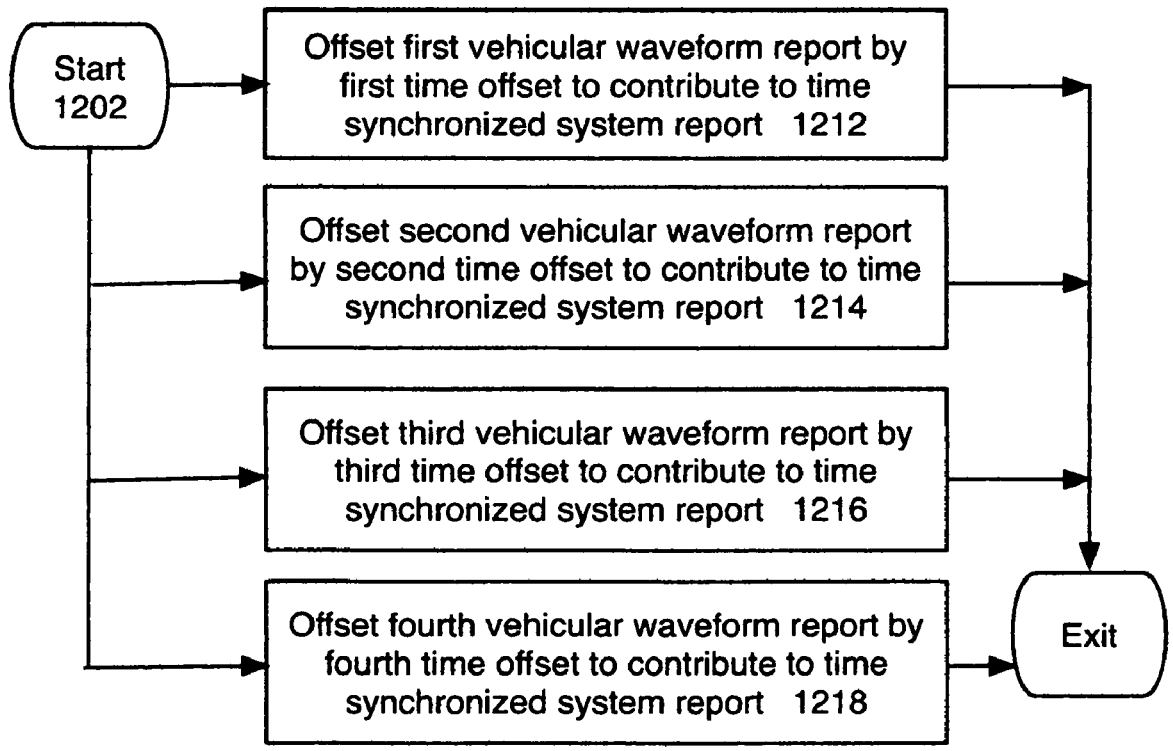

Operation 1202 of FIG. 25A may further include at least one of the operations of FIG. 25B to create the time synchronized system report from the vehicular waveform reports.

Operation 1212 supports offsetting the first vehicular waveform report 132-1 by the first time offset 1072-1 to create the first sensor sample 1084-1 of at least one system event entry 1082 to contribute to the time synchronized system report 1080.

Operation 1214 supports offsetting the second vehicular waveform report 132-2 by the second time offset 1072-2 to create the second sensor sample 1084-2 of at least one system event entry to contribute to the time synchronized system report.

Operation 1216 supports offsetting the third vehicular waveform report 132-3 by a third time offset to create the third sensor sample of at least one system event entry to contribute to the time synchronized system report, as in FIGS. 2A to 3C.

Operation 1218 supports offsetting the fourth vehicular waveform report 132-4 by a fourth time offset to create the fourth sensor sample of at least one system event entry to contribute to the time synchronized system report, as in FIGS. 2A to 3C.

Figure 26A:
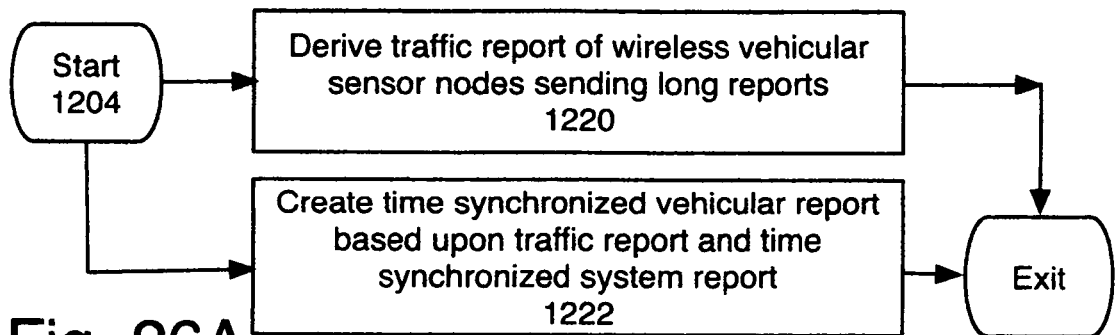

Operation 1204 of FIG. 25A may further include at least one of the operations of FIG. 26A to create the time synchronized vehicular report from the time synchronized system report.

Operation 1220 supports deriving the traffic report 1056 of those wireless vehicular sensor nodes sending at least one long report 190.

Operation 1222 supports creating the time synchronized vehicular report 1090 based upon the traffic report and the time synchronized system report 1080.

Figure 26B:
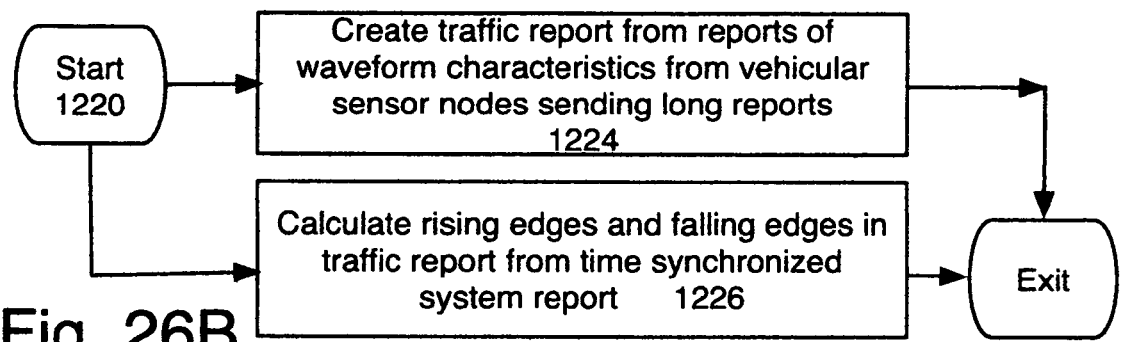

Operation 1220 of FIG. 25A may further include at least one of the operations of FIG. 26B to create the traffic report from the vehicular waveform reports.

Operation 1224 supports creating the traffic report 1056 from the report 180 of the waveform characteristic 120 for at least one wireless vehicular sensor node 500 sending the long report 190.

Operation 1226 supports calculating at least one rising edge 118-R and/or falling edge 118-F in the traffic report from the time synchronized system report 1080.

Figure 26C:
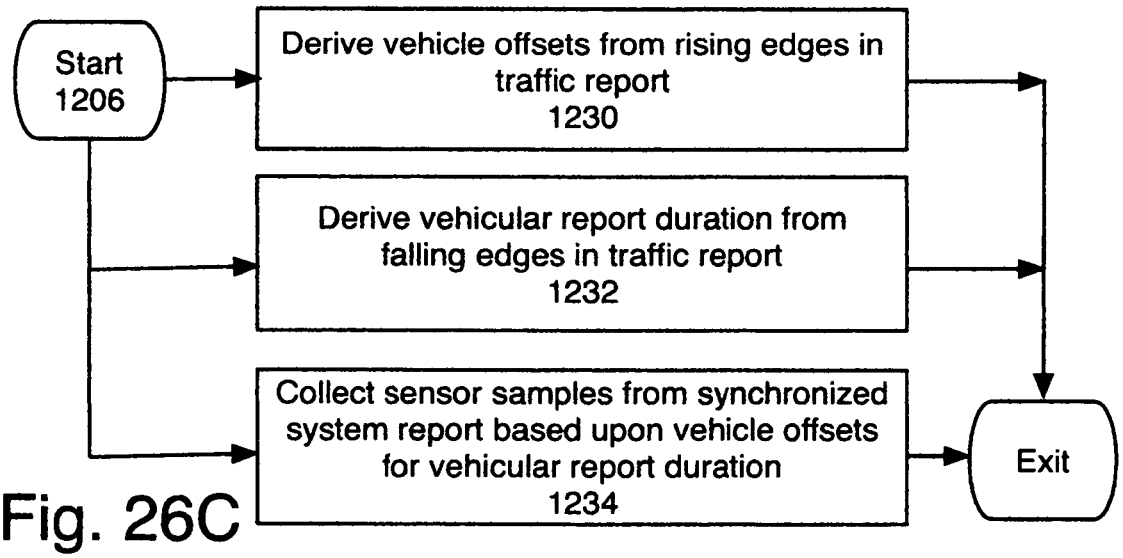

Operation 1222 of FIG. 26A may further include the operations of FIG. 26C to create 15 the time synchronized vehicular report based upon the traffic report and the time synchronized system report.

Operation 1230 supports deriving the vehicle offsets from the rising edges in the traffic report 1056. By way of example, this includes deriving the first sensor offset 1098-1 based upon the rising edge 118-R in the traffic report from the first wireless vehicular sensor node 500-1, and deriving the second sensor offset 1098-2 based upon the rising edge from the second wireless vehicular sensor node 500-2.

Operation 1232 supports deriving the report duration 1099 from at least one falling edge 118-F in the traffic report.

Operation 1234 supports collecting sensor samples from the time synchronized system report 1080 based upon the vehicle offsets for the report duration. By way of example, the vehicle event entry 1092 at the wave time 1096 shown in FIG. 19 includes a first sensor sample 1084-1 collected from the time synchronized system report based upon the first sensor offset, and a second sensor sample 1084-2 collected based upon the second sensor offset.

The preceding embodiments provide examples of the invention and are not meant to constrain the scope of the following claims.

What is claimed is:

1. A method of using a first wireless vehicular sensor node and a second wireless vehicular sensor node, comprising the steps of:
    creating a time synchronized system report from wirelessly receiving a first vehicular waveform report from said first wireless vehicular sensor node time-synchronized with a second vehicular waveform report from said second wireless vehicular sensor node;
    wherein said first vehicular waveform report approximates a first raw vehicular sensor waveform observed by a first magnetic sensor at said first wireless vehicular sensor node based upon the presence of a first vehicle;
    wherein said second vehicular waveform report approximates a second raw vehicular sensor waveform observed by a second magnetic sensor at said second wireless vehicular sensor node based upon the presence of a second vehicle;
    wherein said first wireless vehicular sensor node operates said first magnetic sensor; and wherein said second wireless vehicular sensor node operates said second magnetic sensor.

2. The method of claim 1, wherein said second vehicle is said first vehicle.

3. The method of claim 1, wherein said second vehicle is distinct from said first vehicle.

4. The method of claim 1, further comprising the step:
    said first wireless vehicular sensor node and said second wireless vehicular sensor node both receiving a time synchronization message;
    wherein said first raw vehicular sensor waveform observed at said first wireless vehicular sensor node is time synchronized with said second raw vehicular sensor waveform observed at said second wireless vehicular sensor node.

5. The method of claim 4, wherein the step of said first and second wireless nodes both receiving said time synchronization message, further comprises the step:
    said first wireless vehicular sensor node and said second wireless vehicular sensor node both wirelessly receiving said time synchronization message.

6. The method of claim 5, further comprises the step:
    an access point sending said time synchronization message to said first wireless vehicular sensor node and said second wireless vehicular sensor node;
    wherein said access point wirelessly communicates with said first said first wireless vehicular sensor node and with said second wireless vehicular sensor node.

7. The method of claim 6, wherein at least one of said first wireless vehicular sensor node and said second wireless vehicular sensor node are included in a wireless vehicular sensor network.

8. The method of claim 7, wherein said wireless vehicular sensor network, includes:
    each of said first wireless vehicular sensor node and said second wireless vehicular sensor node.

9. The method of claim 8, wherein said wireless vehicular sensor network, further includes:
    an access point wirelessly communicating with said first wireless vehicular sensor node and with said second wireless vehicular sensor node.

10. The method of claim 9, wherein the step wirelessly receiving is comprised of the step:
    wirelessly receiving via said access point said first vehicular waveform report from said first wireless vehicular sensor node time-synchronized with said second vehicular waveform report from said second wireless vehicular sensor node.

11. The method of claim 1, wherein the step wirelessly receiving said first vehicular waveform report time-synchronized with said second vehicular waveform report, further comprises the step:
    wirelessly receiving said first vehicular waveform report from said first wireless vehicular sensor node time-interleaved with said second vehicular waveform report from said second wireless vehicular sensor node.

12. The method of claim 1, wherein the step wirelessly receiving said first vehicular waveform report time-synchronized with said second vehicular waveform report, further comprises the step:
    wirelessly receiving said first vehicular waveform report from said first wireless vehicular sensor node time-synchronized with said second vehicular waveform report from said second wireless vehicular sensor node, when said first vehicle is within a first distance of said first magnetic sensor, and when said second vehicle is within a second distance of said second magnetic sensor.

13. The method of claim 12, wherein said first distance is essentially the same as said second distance.

14. The method of claim 12, wherein said first distance is distinct from said second distance.

15. The method of claim 12, wherein both said first distance and said second distance are at most three meters.

16. The method of claim 1, wherein said first wireless vehicular sensor node includes said first magnetic sensor.

17. The method of claim 1, the step wirelessly receiving further comprises at least one of the steps of the group consisting of:

wirelessly receiving said first vehicular waveform report from said first wireless vehicular sensor node
time-synchronized with a third vehicular waveform report from a third wireless vehicular sensor node;
wirelessly receiving said second vehicular waveform report from said second wireless vehicular sensor node time-synchronized with said third vehicular waveform report from said third wireless vehicular sensor node; and
wirelessly receiving said first vehicular waveform report from said first wireless vehicular sensor node time-synchronized with said second vehicular waveform report from said second wireless vehicular sensor node, and
time-synchronized with said third vehicular waveform report from said third wireless vehicular sensor node.

18. The first vehicular waveform report and the second vehicular waveform report as products of the process of claim 1.

19. An apparatus implementing the method of claim 1, comprising:
means for wirelessly receiving said first vehicular waveform report from said first wireless vehicular sensor node time-interleaved with said second vehicular waveform report from said second wireless vehicular sensor node.

20. The apparatus of claim 19, further comprising:
a wireless vehicular sensor network, including:
said first wireless vehicular sensor node and said second wireless vehicular sensor node; and
an access point wirelessly communicating with said first wireless vehicular sensor node and said second wireless vehicular sensor node.

21. The apparatus of claim 20, wherein the means for wirelessly receiving comprises:
means for wirelessly receiving via said access point said first vehicular waveform report from said first wireless vehicular sensor node time-interleaved with said second vehicular waveform report from said second wireless vehicular sensor node.

22. The apparatus of claim 21, wherein said first wireless vehicular sensor node and said second wireless vehicular sensor node both wirelessly receive a time synchronization message;
wherein said raw vehicular sensor waveform observed at said first wireless vehicular sensor node is time synchronized with said second raw vehicular sensor waveform observed at said second wireless vehicular sensor node.

23. The apparatus of claim 22, further comprises:
said access point sending said time synchronization message to said first wireless vehicular sensor node and said second wireless vehicular sensor node.

24. The apparatus of claim 23, wherein said wireless vehicular sensor network supports at least one wireless communications standard.

25. The apparatus of claim 24, wherein said wireless vehicular sensor network supports at least one member of the group consisting of:
a version of the IEEE 802[period]15 communications standard;
a version of the Global System for Mobile (GSM) communications standard;
a version of the General Packet Radio Service (GPRS) communications standard;
a version of the IS-95 communications standard; and
a version of the IEEE 802[period]11 communications standard.

26. The apparatus of claim 21, wherein said access point supports a wireless communications protocol incorporating elements of a Code Division Multiple Access communications scheme.

27. The apparatus of claim 19, wherein said first wireless vehicular sensor node includes said first magnetic sensor.

28. The apparatus of claim 19, wherein said second wireless vehicular sensor node includes said second magnetic sensor.

29. The apparatus of claim 19,
wherein said first wireless vehicular sensor node transmits said first vehicular waveform report when said first raw vehicular sensor waveform indicates said first vehicle is within said first distance; and
wherein said second wireless vehicular sensor node transmits said second vehicular waveform report when said second raw vehicular sensor waveform indicates said second vehicle is within said second distance.

30. The apparatus of claim 19, wherein the means for wirelessly receiving may include at least one instance of at least one member of the group consisting of:
a computer at least partly implementing said method by wirelessly communicating with at least one of said first wireless vehicular sensor node, and said second wireless vehicular sensor node, and accessibly coupled to a memory including at least one program step included in a program system directing said computer in implementing said method;
a finite state machine at least partly implementing said method by wirelessly communicating with at least one of said first wireless vehicular sensor node, and said second wireless vehicular sensor node;
an inferential engine at least partly implementing said method by wirelessly communicating with at least one of said first wireless vehicular sensor node, and said second wireless vehicular sensor node;
wherein wirelessly communicating with said first wireless vehicular sensor node, includes:
communicating with said first wireless vehicular sensor node to wirelessly receive said first vehicular waveform report; and
wherein wirelessly communicating with said second wireless vehicular sensor node, includes:
communicating with said second wireless vehicular sensor node to wirelessly receive said second vehicular waveform report.

31. The apparatus of claim 30,
wherein said computer communicating with said first wireless vehicular sensor node to wirelessly receive said first vehicular waveform report, further comprises:
said computer communicating via an access point with said first wireless vehicular sensor node to wirelessly receive said first vehicular waveform report;
wherein said computer communicating with said second wireless vehicular sensor node to wirelessly receive said second vehicular waveform report, further comprises:
said computer communicating via said access point with said second wireless vehicular sensor node to wirelessly receive said second vehicular waveform report;
wherein said finite state machine communicating with said first wireless vehicular sensor node to wirelessly receive said first vehicular waveform report, further comprises:

said finite state machine communicating via an access point with said first wireless vehicular sensor node to wirelessly receive said first vehicular waveform report;

wherein said finite state machine communicating with said second wireless vehicular sensor node to wirelessly receive said second vehicular waveform report, further comprises:

said finite state machine communicating via said access point with said second wireless vehicular sensor node to wirelessly receive said second vehicular waveform report;

wherein said inferential engine communicating with said first wireless vehicular sensor node to wirelessly receive said first vehicular waveform report, further comprises:

said inferential engine communicating via an access point with said first wireless vehicular sensor node to wirelessly receive said first vehicular waveform report; and wherein said inferential engine communicating with said second wireless vehicular sensor node to wirelessly receive said second vehicular waveform report, further comprises:

said inferential engine communicating via said access point with said second wireless vehicular sensor node to wirelessly receive said second vehicular waveform report.

32. The apparatus of claim 31, wherein said access point, includes said means for wirelessly receiving.

33. The apparatus of claim 31, wherein said access point is a base station communicating with at least one member of the group consisting of: said first wireless vehicular sensor node and said second wireless vehicular sensor node.

34. The method of claim 1, further comprising the step: creating a time synchronized vehicular report from said time synchronized system report.

35. The method of claim 34, wherein the step creating said time synchronized vehicular report, further comprises the steps:

deriving a traffic report from said time synchronized system report; and creating said time synchronized vehicular report based upon said traffic report and based upon said time synchronized system report.

36. The time synchronized vehicular report as a product of the process of claim 34.

37. The time-synchronized system report as a product of the process of claim 1.

38. A program system implementing the method of claim 34 residing in a memory for accessible coupling to at least one computer, comprising at least one member of the group consisting of the program steps:

creating said time synchronized system report from wirelessly receiving said first vehicular waveform report from said first wireless vehicular sensor node time-synchronized with said second vehicular waveform report from said second wireless vehicular sensor node;

creating said time synchronized vehicular report from said time synchronized system report.

39. The program system of claim 38, wherein said memory includes at least one instance of at least one member of the group consisting of: a magnetic disk; an optical disk; a non-volatile memory component; a volatile memory component; and a bar coded medium.

40. The method of claim 1, wherein said first vehicular waveform report includes a first transmit time when said first wireless vehicular sensor node transmitted said first vehicular waveform report;

wherein the step creating said time synchronized system report, further comprises the step:

creating said time synchronized system report from wirelessly receiving said first vehicular waveform report from said first wireless vehicular sensor node and based upon a reception time for said first vehicular waveform report.

* * * * *